(12) United States Patent
Si et al.

(10) Patent No.: US 11,419,059 B2
(45) Date of Patent: Aug. 16, 2022

(54) UPLINK POWER CONTROL METHOD AND MOBILE TERMINAL

(71) Applicant: CHINA ACADEMY OF TELECOMMUNICATIONS TECHNOLOGY, Beijing (CN)

(72) Inventors: Qianqian Si, Beijing (CN); Fangchen Cheng, Beijing (CN); Xiangli Lin, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 145 days.

(21) Appl. No.: 16/764,667

(22) PCT Filed: Sep. 29, 2018

(86) PCT No.: PCT/CN2018/108701
§ 371 (c)(1),
(2) Date: May 15, 2020

(87) PCT Pub. No.: WO2019/095880
PCT Pub. Date: May 23, 2019

(65) Prior Publication Data
US 2020/0374805 A1    Nov. 26, 2020

(30) Foreign Application Priority Data

Nov. 17, 2017  (CN) .......................... 201711146106.2
Jan. 11, 2018   (CN) .......................... 201810027456.5
(Continued)

(51) Int. Cl.
*H04W 52/14* (2009.01)
*H04W 52/58* (2009.01)

(52) U.S. Cl.
CPC ......... *H04W 52/146* (2013.01); *H04W 52/58* (2013.01)

(58) Field of Classification Search
CPC .. H04W 52/146; H04W 52/58; H04W 52/325
See application file for complete search history.

(56) References Cited

U.S. PATENT DOCUMENTS

2011/0205991 A1* 8/2011 Kim .................. H04W 72/1289
                                                             370/329
2013/0286948 A1* 10/2013 Gao ....................... H04W 52/18
                                                             370/328
(Continued)

FOREIGN PATENT DOCUMENTS

CN    101969685 A    2/2011
CN    102045827 A    5/2011
(Continued)

OTHER PUBLICATIONS

"Design of long-PUCCH for UCI of more than 2 bits"; Panasonic; 3GPP TSG RAN WG1 Meeting #90bis R1-1718257 Prague, CZ, Oct. 9-13, 2017 (Year: 2017).*

"Channel structure and frequency-hopping details of long-PUCCH for UCI of up to 2 bits"; Panasonic; 3GPP TSG RAN WG1 Meeting #90bis R1-1718254 Prague, CZ, Oct. 9-13, 2017 (Year: 2017).*

(Continued)

*Primary Examiner* — Benjamin H Elliott, IV
(74) *Attorney, Agent, or Firm* — Harness, Dickey & Pierce, P.L.C.

(57) ABSTRACT

An uplink power control method and a mobile terminal are provided. The method includes: acquiring an uplink transmission parameter corresponding to an uplink channel format; calculating an uplink power adjustment value according to the uplink transmission parameter, to control an uplink power.

12 Claims, 9 Drawing Sheets

(30) Foreign Application Priority Data

| Jan. 12, 2018 | (CN) | 201810031361.0 |
| Mar. 9, 2018 | (CN) | 201810195735.2 |

(56) References Cited

U.S. PATENT DOCUMENTS

| 2014/0022994 A1* | 1/2014 | Pan | H04W 52/18 370/328 |
| 2014/0023028 A1* | 1/2014 | Zhang | H04W 52/325 370/329 |
| 2014/0133415 A1* | 5/2014 | Damnjanovic | H04W 72/0413 370/329 |
| 2014/0153536 A1* | 6/2014 | Ouchi | H04L 5/0037 370/329 |
| 2014/0204842 A1* | 7/2014 | Kim | H04W 52/146 370/328 |
| 2014/0369294 A1* | 12/2014 | Seo | H04L 27/2628 370/329 |
| 2015/0223213 A1* | 8/2015 | Moon | H04W 52/40 370/329 |
| 2015/0358918 A1* | 12/2015 | Gao | H04W 52/325 455/522 |
| 2015/0365218 A1* | 12/2015 | Yang | H04L 5/0051 370/329 |
| 2016/0270060 A1* | 9/2016 | Kusashima | H04W 72/042 |
| 2018/0124815 A1* | 5/2018 | Papasakellariou | H04W 72/0446 |
| 2018/0220374 A1* | 8/2018 | Yan | H04W 52/146 |
| 2018/0279296 A1* | 9/2018 | Hosseini | H04L 5/001 |
| 2018/0324787 A1* | 11/2018 | Yin | H04L 1/1861 |
| 2019/0098580 A1* | 3/2019 | Babaei | H04W 52/146 |
| 2019/0289513 A1* | 9/2019 | Jeon | H04W 72/0453 |
| 2020/0107275 A1* | 4/2020 | Cho | H04B 7/0695 |
| 2020/0221394 A1* | 7/2020 | Yoshimura | H04W 52/325 |
| 2020/0374805 A1* | 11/2020 | Si | H04W 52/325 |

FOREIGN PATENT DOCUMENTS

| CN | 102083181 A | 6/2011 |
| CN | 103313368 A | 9/2013 |
| CN | 104205710 A | 12/2014 |
| EP | 2696628 A1 | 2/2014 |
| WO | WO-2016/163759 A1 | 10/2016 |
| WO | WO-2016204585 A1 | 12/2016 |
| WO | WO-2017049744 A1 | 3/2017 |

OTHER PUBLICATIONS

"RE mapping for PUCCH of 1 or 2 bits"; ETRI; 3GPP TSG RAN WG1 Meeting 90bis R1-1718005 Prague, CZ, Oct. 9-13, 2017 (Year: 2017).*

3rd Generation Partnership Project; Technical Specification Group Radio Access Network; Evolved Universal Terrestrial Radio Access (E-UTRA); Physical channels and modulation. 3GPP TX 36.211 V13.7.1, Release 13, vol. RAN WG1, Sep. 26, 2017, pp. 8-66, XP051337361, Mobile Competence Centre, Sophia-Antipolis Cedex, France.

3rd Generation Partnership Project; Technical Specification Group Radio Access Network; Evolved Universal Terrestrial Radio Access (E-UTRA); Physical layer procedures, 3GPP TS 36.213 V14.4.0, Release 14, vol. RAN WG1, Sep. 26, 2017, pp. 8-49, XP051337377, Mobile Competence Centre, Sophia-Antipolis Cedex, France.

Catt, "Correction on NR PUCCH Power Control Formula", 3GPP Draft; R1-1801746, Mobile Competence Centre, Sophia-Antipolis Cedex, France, vol. RAN WG1, Athens, Greece, Feb. 17, 2018, XP051397727.

Samsung Catt, "WF on Delta PUCCH TF for NR PUCCH power control", 3GPP Draft; R1-1803477 WF on Delta PUCCH TF, Mobile Competence Centre, Sophia-Antipolis Cedex, France, vol. RAN WG1, Athens, Greece, Mar. 5, 2018, XP051398774.

Ericsson, "Power control for new PUCCH format", 3GPP Draft; R1-155543, 3rd Generation Partnership Project (3GPP), Mobile Competence Centre, Sophia-Antipolis Cedex, France, vol. RAN WG1, Malmo, Sweden, Oct. 4, 2015, XP051039685.

Extended European Search Report dated Dec. 3, 2020 for Application No. EP 18 87 9118.0.

Office Action dated Jun. 15, 2021 in Japanese Application No. 2020-526897.

Samsung, "NR PUCCH power control framework," 3GPP TSG RAN WG1 #90b R1-1719179, Oct. 17, 2015.

Catt, "Remaining Aspects of NR Power Control," 3GPP TSG RAN WG1 Meeting #91, R1-1720215, Nov. 27, 2017.

Written Opinion and International Search Report dated May 19, 2020 for International Application No. PCT/CN2018/108701.

Chinese Office Action dated Mar. 19, 2020 for CN Application No. 201810195735.2.

Taiwanese Office Action dated Jul. 16, 2020 for Application No. 10820673960.

Chaitanya Tumula and Erik G. Larsson, Improving 3GPP-LTE Uplink Control Signaling by Repetition Across Frequency Bands, 2013, Proceedings of the IEEE International Conference on Communications (ICC).

Samsung, "On UL Power Control", 3GPP TSG RAN W1 Meeting 90bis, R1-1717692, Prague, CZ, Oct. 9-13, 2017.

* cited by examiner

UPLINK POWER CONTROL METHOD AND MOBILE TERMINAL

CROSS-REFERENCE TO RELATED APPLICATIONS

This application is the U.S. national phase of PCT Application PCT/CN2018/108701 filed on Sep. 29, 2018, which claims a priority to Chinese Patent Application No. 201711146106.2 filed on Nov. 17, 2017 and a priority to Chinese Patent Application No. 201810027456.5 filed on Jan. 11, 2018 and a priority to Chinese Patent Application No. 201810031361.0 filed on Jan. 12, 2018 and a priority to Chinese Patent Application No. 201810195735.2 filed on Mar. 9, 2018, the disclosures of each of which are incorporated in their entirety by reference herein.

TECHNICAL FIELD

The present disclosure relates to the field of communication technology, and in particular to an uplink power control method and a mobile terminal.

BACKGROUND

With the development and changes of mobile communication service requirements, organizations such as the International Telecommunication Union (ITU) and the 3rd Generation Partnership Project (3GPP) and other organizations have begun to study new wireless communication systems (New RAT, NR for short), such as the $5^{th}$ generation wireless communication system ($5^{th}$ Generation RAT, 5G NR for short). At present, for the future NR, there is no specific plan on how to control the uplink power.

In the Long Term Evolution (LTE) wireless communication system, a power control may be performed on the Physical Uplink Control Channel (PUCCH) in slot i on the carrier c by the following formula:

$$P_{PUCCH,c}(i) = \min\begin{Bmatrix} P_{CMAX,c}(i), \\ P_{0\_PUCCH,c}(b) + PL_c(k) + \Delta_{F\_PUCCH,c}(F) + \\ \Delta_{PUCCH\_TF,c}(i) + g_c(i, l) \end{Bmatrix}[dBm]$$

where $\Delta_{PUCCH\_TF,c}(i)$ represents the power adjustment value of PUCCH, and the adjustment value is related to the transmission format of PUCCH.

Since the NR and LTE PUCCH formats differ in bit range and coding method, the LTE PUCCH power control method cannot be applied to the NR. If the definition of $\Delta_{PUCCH\_TF,c}(i)$ in LTE is reused in NR, the transmission performance of PUCCH in NR may be degraded.

SUMMARY

In view of this, an uplink power control method and a mobile communication terminal are provided in the present disclosure, to solve the technical issue that the PUCCH power control method of LET cannot be applied to NR due to different PUCCH formats of NR and LTE.

To solve the above technical issue, an uplink power control method is provided in the present disclosure, including:

acquiring an uplink transmission parameter corresponding to an uplink channel format;

calculating an uplink power adjustment value according to the uplink transmission parameter, to control an uplink power.

Optionally, the uplink channel format is a first Physical Uplink Control Channel (PUCCH) format, and the first PUCCH format is a short PUCCH format of 2 bits or less than 2 bits;

the acquiring the uplink transmission parameter corresponding to the uplink channel format includes:

acquiring a quantity of symbols occupied by the first PUCCH format;

the calculating the uplink power adjustment value according to the uplink transmission parameter includes:

calculating the uplink power adjustment value according to the quantity of the symbols occupied by the first PUCCH format.

Optionally, the calculating the uplink power adjustment value according to the quantity of the symbols occupied by the first PUCCH format includes:

calculating the uplink power adjustment value by the following formula:

$$\Delta_{PUCCH\_TF,c}(i) = 10\log_{10}\left(\frac{N_{ref}}{N_{symb}^{PUCCH}}\right);$$

where $\Delta_{PUCCH\_TF,c}(i)$ is the uplink power adjustment value, $N_{symb}^{PUCCH}$ is the quantity of symbols occupied by the first PUCCH format, and $N_{ref}$ is a reference coefficient corresponding to the first PUCCH format.

Optionally, a value of $N_{ref}$ is a preset value or a value configured by a high-layer signaling.

Optionally, the uplink channel format is a second PUCCH format, and the second PUCCH format is a long PUCCH format of 2 bits or less than 2 bits;

the acquiring the uplink transmission parameter corresponding to the uplink channel format includes:

acquiring a quantity of symbols occupied by the second PUCCH format and a quantity of symbols occupied by a Demodulation Reference Signal (DMRS) in the second PUCCH format;

the calculating the uplink power adjustment value according to the uplink transmission parameter includes:

calculating the uplink power adjustment value according to the quantity of the symbols occupied by the second PUCCH format and the quantity of the symbols occupied by the DMRS in the second PUCCH format.

Optionally, the calculating the uplink power adjustment value according to the quantity of the symbols occupied by the second PUCCH format and the quantity of the symbols occupied by the DMRS in the second PUCCH format includes:

calculating the uplink power adjustment value by the following formula:

$$\Delta_{PUCCH\_TF,c}(i) = 10\log_{10}\left(\frac{N_{ref}}{N_{symb}^{PUCCH} - N_{DMRS-symb}^{PUCCH}}\right);$$

where $\Delta_{PUCCH\_TF,c}(i)$ is the uplink power adjustment value, $N_{symb}^{PUCCH}$ is the quantity of symbols occupied by the second PUCCH format, $N_{DMRS-symb}^{PUCCH}$ is the quantity of symbols occupied by the DMRS in the second PUCCH format, and $N_{ref}$ is a reference coefficient corresponding to the second PUCCH format.

Optionally, a value of $N_{ref}$ is a preset value or a value configured by a high-layer signaling.

Optionally, the uplink channel format is a third PUCCH format, and the third PUCCH format is a short PUCCH format of more than 2 bits;

the acquiring the uplink transmission parameter corresponding to the uplink channel format includes:

acquiring a bit quantity of an Uplink Control Signal (UCI) corresponding to the third PUCCH format and a quantity of Resource Elements (RE) carrying the UCI;

the calculating the uplink power adjustment value according to the uplink transmission parameter includes:

calculating the uplink power adjustment value according to the bit quantity of the UCI and the quantity of the REs.

Optionally, the calculating the uplink power adjustment value according to the bit quantity of the UCI and the quantity of the REs carrying the UCI includes:

in the case that the bit quantity of the UCI is greater than 2 and less than or equal to 11, calculating the uplink power adjustment value by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs, $N_{RE} = \frac{2}{3} * N_{symb}^{PUCCH} * M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value;

in the case that the bit quantity of the UCI is greater than 11, calculating the uplink power adjustment value by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, $O_{UCI}$ is the bit quantity of the UCI, and $N_{RE}$ is the quantity of the REs, $N_{RE} = \frac{2}{3} * N_{symb}^{PUCCH} * M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers, and k is greater than or equal to 3 and less than or equal to 7.

Optionally, the uplink channel format is a third PUCCH format, and the third PUCCH format is a short PUCCH format of more than 2 bits;

the acquiring the uplink transmission parameter corresponding to the uplink channel format includes:

acquiring a bit quantity of a UCI corresponding to the third PUCCH format, a quantity of REs carrying the UCI and a frequency hopping configuration parameter of the third PUCCH format; the frequency hopping configuration parameter includes: a parameter of enabling a frequency hopping for a PUCCH or a parameter of not enabling a frequency hopping for a PUCCH;

the calculating the uplink power adjustment value according to the uplink transmission parameter includes:

calculating the uplink power adjustment value according to the bit quantity of the UCI, the quantity of the REs and the frequency hopping configuration parameter of the third PUCCH format.

Optionally, the calculating the uplink power adjustment value according to the bit quantity of the UCI, the quantity of the REs and the frequency hopping configuration parameter of the third PUCCH format includes:

in the case that the bit quantity of UCI is greater than 2 and less than or equal to 11, calculating the uplink power adjustment value by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE} = \frac{2}{3} * N_{symb}^{PUCCH} * M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value, where a value of k is related to the frequency hopping configuration parameter of the third PUCCH format, or the value of k is not related to the frequency hopping configuration parameter of the third PUCCH format;

in the case that the bit quantity of UCI is greater than 11, calculating the uplink power adjustment value by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE} = \frac{2}{3} * N_{symb}^{PUCCH} * M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers;

in the case that the value of k is related to the frequency hopping configuration parameter of the third PUCCH format, a value range of k includes:

in the case that the frequency hopping is not enabled for the third PUCCH format, k is greater than or equal to 5 and less than or equal to 7;

in the case that the frequency hopping is enabled for the third PUCCH format, k is greater than or equal to 3 and less than 5;

or in the case that the value of k is not related to the frequency hopping configuration parameter of the third PUCCH format, k is greater than or equal to 3, and less than or equal to 7.

Optionally, the uplink channel format is a fourth PUCCH format, and the fourth PUCCH format is a long PUCCH format of more than 2 bits;

the acquiring the uplink transmission parameter corresponding to the uplink channel format includes:

acquiring a bit quantity of a UCI corresponding to the fourth PUCCH format and a quantity of REs carrying the UCI;

the calculating the uplink power adjustment value according to the uplink transmission parameter includes:

calculating the uplink power adjustment value according to the bit quantity of the UCI and the quantity of the REs.

Optionally, the calculating the uplink power adjustment value according to the bit quantity of the UCI and the quantity of the REs carrying the UCI includes:

in the case that the bit quantity of the UCI is greater than 2 and less than or equal to 11, calculating the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value;

in the case that the bit quantity of the UCI is greater than 11, calculating the uplink power adjustment value by the following formula:

$$\Delta_{PUCCH\_TF,c}(i) = 10\log_{10}\left(\frac{O_{UCI}}{2}*2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by the DMRS in the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers, and k is greater than or equal to 3 and less than or equal to 9.

Optionally, the uplink channel format is a fourth PUCCH format, and the fourth PUCCH format is a long PUCCH format of more than 2 bits;

the acquiring the uplink transmission parameter corresponding to the uplink channel format includes:

acquiring a bit quantity of a UCI corresponding to the fourth PUCCH format, a quantity of REs carrying the UCI and a frequency hopping configuration parameter of the fourth PUCCH format; the frequency hopping configuration parameter includes: a parameter of enabling a frequency hopping for a PUCCH or a parameter of not enabling a frequency hopping for a PUCCH;

the calculating the uplink power adjustment value according to the uplink transmission parameter includes:

calculating the uplink power adjustment value according to the bit quantity of the UCI, the quantity of the REs and the frequency hopping configuration parameter of the fourth PUCCH format.

Optionally, the calculating the uplink power adjustment value according to the bit quantity of the UCI, the quantity of the REs and the frequency hopping configuration parameter of the fourth PUCCH format includes:

in the case that the bit quantity of UCI is greater than 2 and less than or equal to 11, calculating the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value, where a value of k is related to the frequency hopping configuration parameter of the fourth PUCCH format, or the value of k is not related to the frequency hopping configuration parameter of the fourth PUCCH format;

in the case that the bit quantity of UCI is greater than 11, calculating the uplink power adjustment value by the following formula:

$$\Delta_{PUCCH\_TF,c}(i) = 10\log_{10}\left(\frac{O_{UCI}}{2}*2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers;

in the case that the value of k is related to the frequency hopping configuration parameter of the fourth PUCCH format, a value range of k includes:

in the case that the frequency hopping is not enabled for the fourth PUCCH format, k is greater than or equal to 7 and less than or equal to 9;

in the case that the frequency hopping is enabled for the fourth PUCCH format, k is greater than or equal to 3 and less than 5;

or in the case that the value of k is not related to the frequency hopping configuration parameter of the fourth PUCCH format, k is greater than or equal to 3, and less than or equal to 9.

Optionally, the fourth PUCCH format includes two PUCCH formats of supporting user multiplexing and not supporting user multiplexing.

Optionally, the uplink channel format is a third PUCCH format or a fourth PUCCH format;

where the third PUCCH format is a short PUCCH format of more than 2 bits, and the fourth PUCCH format is a long PUCCH format of more than 2 bits;

the acquiring the uplink transmission parameter corresponding to the uplink channel format includes:

acquiring a bit quantity of a UCI corresponding to a PUCCH format and a quantity of REs carrying the UCI;

the calculating the uplink power adjustment value according to the uplink transmission parameter includes:

calculating the uplink power adjustment value according to the bit quantity of the UCI and the quantity of the REs.

Optionally, the calculating the uplink power adjustment value according to the bit quantity of the UCI and the quantity of the REs includes:

in the case that the bit quantity of the UCI is greater than 2 and less than or equal to 11, calculating the uplink power adjustment value by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs;

in the case that the PUCCH is in the third PUCCH format, $N_{RE} = \frac{2}{3} * N_{symb}^{PUCCH} * M_{SC}^{PUCCH}$;

in the case that the PUCCH is in the fourth PUCCH format, $N_{RE} = (N_{symb}^{PUCCH} - N_{DMRS-symb}^{PUCCH}) * M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value.

Optionally, the bandwidth occupied by the PUCCH is represented by a quantity of subcarriers, and k is greater than or equal to 3 and less than or equal to 9.

A mobile communication terminal is further provided in the present disclosure, including:

an acquiring module, configured to acquire an uplink transmission parameter corresponding to an uplink channel format;

a calculating module, configured to calculate an uplink power adjustment value according to the uplink transmission parameter, to control an uplink power.

Optionally, the uplink channel format is a first Physical Uplink Control Channel (PUCCH) format, and the first PUCCH format is a short PUCCH format of 2 bits or less than 2 bits;

the acquiring module is further configured to:

acquire a quantity of symbols occupied by the first PUCCH format;

the calculating module is further configured to:

calculate the uplink power adjustment value according to the quantity of the symbols occupied by the first PUCCH format, to control the uplink power.

Optionally, the calculating module is further configured to:

calculate the uplink power adjustment value by the following formula:

$$\Delta_{PUCCH\_TF,c}(i) = 10\log_{10}\left(\frac{N_{ref}}{N_{symb}^{PUCCH}}\right);$$

where $\Delta_{PUCCH\_TF,c}(i)$ is the uplink power adjustment value, $N_{symb}^{PUCCH}$ is the quantity of symbols occupied by the first PUCCH format, and $N_{ref}$ is a reference coefficient corresponding to the first PUCCH format.

Optionally, a value of $N_{ref}$ is a preset value or a value configured by a high-layer signaling.

Optionally, the uplink channel format is a second PUCCH format, and the second PUCCH format is a long PUCCH format of 2 bits or less than 2 bits;

the acquiring module is further configured to:

acquire a quantity of symbols occupied by the second PUCCH format and a quantity of symbols occupied by a Demodulation Reference Signal (DMRS) in the second PUCCH format;

the calculating module is further configured to:

calculate the uplink power adjustment value according to the quantity of the symbols occupied by the second PUCCH format and the quantity of the symbols occupied by the DMRS in the second PUCCH format, to control the uplink power.

Optionally, the calculating module is further configured to:

calculate the uplink power adjustment value by the following formula:

$$\Delta_{PUCCH\_TF,c}(i) = 10\log_{10}\left(\frac{N_{ref}}{N_{sym}^{PUCCH} - N_{DMRS-symb}^{PUCCH}}\right);$$

where $\Delta_{PUCCH\_TF,c}(i)$ is the uplink power adjustment value, $N_{symb}^{PUCCH}$ is the quantity of symbols occupied by the second PUCCH format, $N_{DMRS-symb}^{PUCCH}$ is the quantity of symbols occupied by the DMRS in the second PUCCH format, and $N_{ref}$ is a reference coefficient corresponding to the second PUCCH format.

Optionally, a value of $N_{ref}$ is a preset value or a value configured by a high-layer signaling.

Optionally, the uplink channel format is a third PUCCH format, and the third PUCCH format is a short PUCCH format of more than 2 bits;

the acquiring module is further configured to:

acquire a bit quantity of an Uplink Control Signal (UCI) corresponding to the third PUCCH format and a quantity of Resource Elements (RE) carrying the UCI;

the calculating module is further configured to:

calculate the uplink power adjustment value according to the bit quantity of the UCI and the quantity of the REs, to control the uplink power.

Optionally, the calculating module is further configured to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE} = \frac{2}{3} * N_{symb}^{PUCCH} * M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value;

the calculating module is further configured to:

in the case that the bit quantity of the UCI is greater than 11, calculate the uplink power adjustment value by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers, and k is greater than or equal to 3 and less than or equal to 7.

Optionally, the uplink channel format is a third PUCCH format, and the third PUCCH format is a short PUCCH format of more than 2 bits;

the acquiring module is further configured to:

acquire a bit quantity of a UCI corresponding to the third PUCCH format, a quantity of REs carrying the UCI and a frequency hopping configuration parameter of the third PUCCH format; the frequency hopping configuration parameter includes: a parameter of enabling a frequency hopping for a PUCCH or a parameter of not enabling a frequency hopping for a PUCCH;

the calculating module is further configured to:

calculate the uplink power adjustment value according to the bit quantity of the UCI, the quantity of the REs and the frequency hopping configuration parameter of the third PUCCH format.

Optionally, the calculating module is further configured to:

in the case that the bit quantity of UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value, where a value of k is related to the frequency hopping configuration parameter of the third PUCCH format, or the value of k is not related to the frequency hopping configuration parameter of the third PUCCH format;

the calculating module is further configured to:

in the case that the bit quantity of UCI is greater than 11, calculate the uplink power adjustment value by the following formula:

$$\Delta_{PUCCH\_TF,c}(i) = 10\log_{10}\left(\frac{O_{UCI}}{2}*2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers;

in the case that the value of k is related to the frequency hopping configuration parameter of the third PUCCH format, a value range of k includes:

in the case that the frequency hopping is not enabled for the third PUCCH format, k is greater than or equal to 5 and less than or equal to 7;

in the case that the frequency hopping is enabled for the third PUCCH format, k is greater than or equal to 3 and less than 5;

or in the case that the value of k is not related to the frequency hopping configuration parameter of the third PUCCH format, k is greater than or equal to 3, and less than or equal to 7.

Optionally, the uplink channel format is a fourth PUCCH format, and the fourth PUCCH format is a long PUCCH format of more than 2 bits;

the acquiring module is further configured to:

acquire a bit quantity of a UCI corresponding to the fourth PUCCH format and a quantity of REs carrying the UCI;

the calculating module is further configured to:

calculate the uplink power adjustment value according to the bit quantity of the UCI and the quantity of the REs, to control the uplink power.

Optionally, the calculating module is further configured to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value;

the calculating module is further configured to:

in the case that the bit quantity of the UCI is greater than 11, calculate the uplink power adjustment value by the following formula:

$$\Delta_{PUCCH\_TF,c}(i) = 10\log_{10}\left(\frac{O_{UCI}}{2}*2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by the DMRS in the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers, and k is greater than or equal to 3 and less than or equal to 9.

Optionally, the uplink channel format is a fourth PUCCH format, and the fourth PUCCH format is a long PUCCH format of more than 2 bits;

the acquiring module is further configured to:

acquire a bit quantity of a UCI corresponding to the fourth PUCCH format, a quantity of REs carrying the UCI and a frequency hopping configuration parameter of the fourth PUCCH format; the frequency hopping configuration parameter includes: a parameter of enabling a frequency hopping for a PUCCH or a parameter of not enabling a frequency hopping for a PUCCH;

the calculating module is further configured to:

calculate the uplink power adjustment value according to the bit quantity of the UCI, the quantity of the REs and the frequency hopping configuration parameter of the fourth PUCCH format.

Optionally, the calculating module is further configured to:

in the case that the bit quantity of UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value, where a value of k is related to the frequency hopping configuration parameter of the fourth PUCCH format, or the value of k is not related to the frequency hopping configuration parameter of the fourth PUCCH format;

the calculating module is further configured to:

in the case that the bit quantity of UCI is greater than 11, calculate the uplink power adjustment value by the following formula:

$$\Delta_{PUCCH\_TF,c}(i) = 10\log_{10}\left(\frac{O_{UCI}}{2}*2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers;

in the case that the value of k is related to the frequency hopping configuration parameter of the fourth PUCCH format, a value range of k includes:

in the case that the frequency hopping is not enabled for the fourth PUCCH format, k is greater than or equal to 7 and less than or equal to 9;

in the case that the frequency hopping is enabled for the fourth PUCCH format, k is greater than or equal to 3 and less than 5;

or in the case that the value of k is not related to the frequency hopping configuration parameter of the fourth PUCCH format, k is greater than or equal to 3, and less than or equal to 9.

Optionally, the fourth PUCCH format includes two PUCCH formats of supporting user multiplexing and not supporting user multiplexing.

Optionally, the uplink channel format is a third PUCCH format or a fourth PUCCH format;

where the third PUCCH format is a short PUCCH format of more than 2 bits, and the fourth PUCCH format is a long PUCCH format of more than 2 bits;

the acquiring module is further configured to:

acquire a bit quantity of a UCI corresponding to a PUCCH format and a quantity of REs carrying the UCI;

the calculating module is further configured to:

calculate the uplink power adjustment value according to the bit quantity of the UCI and the quantity of the REs.

Optionally, the calculating module is further configured to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs;

in the case that the PUCCH is in the third PUCCH format, $N_{RE}=\frac{2}{3}*N_{symb}^{PUCCH}*M_{SC}^{PUCCH}$;

in the case that the PUCCH is in the fourth PUCCH format, $N_{RE}=(N_{symb}^{PUCCH}-N_{DMRS-symb}^{PUCCH})*M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value.

Optionally, the bandwidth occupied by the PUCCH is represented by a quantity of subcarriers, and k is greater than or equal to 3 and less than or equal to 9.

A mobile communication terminal is further provided in the present disclosure, including: a memory, a processor, a transceiver and a computer program stored in the memory and executable on the processor, where the computer program is executed by the processor to:

acquire an uplink transmission parameter corresponding to an uplink channel format;

calculate an uplink power adjustment value according to the uplink transmission parameter, to control an uplink power.

Optionally, the uplink channel format is a first Physical Uplink Control Channel (PUCCH) format, and the first PUCCH format is a short PUCCH format of 2 bits or less than 2 bits;

the computer program is executed by the processor to:

acquire a quantity of symbols occupied by the first PUCCH format;

calculate the uplink power adjustment value according to the quantity of the symbols occupied by the first PUCCH format, to control the uplink power.

Optionally, the computer program is executed by the processor to:

calculate the uplink power adjustment value by the following formula:

$$\Delta_{PUCCH\_TF,c}(i) = 10\log_{10}\left(\frac{N_{ref}}{N_{symb}^{PUCCH}}\right);$$

where $\Delta_{PUCCH\_TF,c}(i)$ is the uplink power adjustment value, $N_{symb}^{PUCCH}$ is the quantity of symbols occupied by the first PUCCH format, and $N_{ref}$ is a reference coefficient corresponding to the first PUCCH format.

Optionally, a value of $N_{ref}$ is a preset value or a value configured by a high-layer signaling.

Optionally, the uplink channel format is a second PUCCH format, and the second PUCCH format is a long PUCCH format of 2 bits or less than 2 bits;

the computer program is executed by the processor to:

acquire a quantity of symbols occupied by the second PUCCH format and a quantity of symbols occupied by a Demodulation Reference Signal (DMRS) in the second PUCCH format;

calculate the uplink power adjustment value according to the quantity of the symbols occupied by the second PUCCH format and the quantity of the symbols occupied by the DMRS in the second PUCCH format, to control the uplink power.

Optionally, the computer program is executed by the processor to:

calculate the uplink power adjustment value by the following formula:

$$\Delta_{PUCCH\_TF,c}(i) = 10 \log_{10}\left(\frac{N_{ref}}{N_{symb}^{PUCCH} - N_{DMRS-symb}^{PUCCH}}\right);$$

where $\Delta_{PUCCH\_TF,c}(i)$ is the uplink power adjustment value, $N_{symb}^{PUCCH}$ is the quantity of symbols occupied by the second PUCCH format, $N_{DMRS-symb}^{PUCCH}$ is the quantity of symbols occupied by the DMRS in the second PUCCH format, and $N_{ref}$ is a reference coefficient corresponding to the second PUCCH format.

Optionally, a value of $N_{ref}$ is a preset value or a value configured by a high-layer signaling.

Optionally, the uplink channel format is a third PUCCH format, and the third PUCCH format is a short PUCCH format of more than 2 bits;

the computer program is executed by the processor to:

acquire a bit quantity of an Uplink Control Signal (UCI) corresponding to the third PUCCH format and a quantity of Resource Elements (RE) carrying the UCI;

calculate the uplink power adjustment value according to the bit quantity of the UCI and the quantity of the REs, to control the uplink power.

Optionally, the computer program is executed by the processor to:

in the case that the bit quantity of the UCI is greater than 2 and less than or equal to 11, calculate the uplink power adjustment value by the following formula:

$$\Delta_{PUCCH\_TF,c}(i) = 10 \log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value;

in the case that the bit quantity of the UCI is greater than 11, calculate the uplink power adjustment value by the following formula:

$$\Delta_{PUCCH\_TF,c}(i) = 10 \log_{10}\left(\frac{O_{UCI}}{2} * 2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers, and k is greater than or equal to 3 and less than or equal to 7.

Optionally, the uplink channel format is a third PUCCH format, and the third PUCCH format is a short PUCCH format of more than 2 bits;

the computer program is executed by the processor to:

acquire a bit quantity of a UCI corresponding to the third PUCCH format, a quantity of REs carrying the UCI and a frequency hopping configuration parameter of the third PUCCH format; the frequency hopping configuration parameter includes: a parameter of enabling a frequency hopping for a PUCCH or a parameter of not enabling a frequency hopping for a PUCCH;

calculate the uplink power adjustment value according to the bit quantity of the UCI, the quantity of the REs and the frequency hopping configuration parameter of the third PUCCH format.

Optionally, the computer program is executed by the processor to:

in the case that the bit quantity of UCI is greater than 2 and less than or equal to 11, calculate the uplink power adjustment value by the following formula:

$$\Delta_{PUCCH\_TF,c}(i) = 10 \log_{10}\left(\frac{k * O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value, where a value of k is related to the frequency hopping configuration parameter of the third PUCCH format, or the value of k is not related to the frequency hopping configuration parameter of the third PUCCH format;

in the case that the bit quantity of UCI is greater than 11, calculate the uplink power adjustment value by the following formula:

$$\Delta_{PUCCH\_TF,c}(i) = 10 \log_{10}\left(\frac{O_{UCI}}{2} * 2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers;

in the case that the value of k is related to the frequency hopping configuration parameter of the third PUCCH format, a value range of k includes:

in the case that the frequency hopping is not enabled for the third PUCCH format, k is greater than or equal to 5 and less than or equal to 7;

in the case that the frequency hopping is enabled for the third PUCCH format, k is greater than or equal to 3 and less than 5;

or in the case that the value of k is not related to the frequency hopping configuration parameter of the third PUCCH format, k is greater than or equal to 3, and less than or equal to 7.

Optionally, the uplink channel format is a fourth PUCCH format, and the fourth PUCCH format is a long PUCCH format of more than 2 bits;

the computer program is executed by the processor to:

acquire a bit quantity of a UCI corresponding to the fourth PUCCH format and a quantity of REs carrying the UCI;

calculate the uplink power adjustment value according to the bit quantity of the UCI and the quantity of the REs, to control the uplink power.

Optionally, the computer program is executed by the processor to:

in the case that the bit quantity of the UCI is greater than 2 and less than or equal to 11, calculate the uplink power adjustment value by the following formula:

$$\Delta_{PUCCH\_TF,c}(i) = 10 \log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value;

in the case that the bit quantity of the UCI is greater than 11, calculate the uplink power adjustment value by the following formula:

$$\Delta_{PUCCH\_TF,c}(i) = 10 \log_{10}\left(\frac{O_{UCI}}{2} * 2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by the DMRS in the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers, and k is greater than or equal to 3 and less than or equal to 9.

Optionally, the uplink channel format is a fourth PUCCH format, and the fourth PUCCH format is a long PUCCH format of more than 2 bits;

the computer program is executed by the processor to:

acquire a bit quantity of a UCI corresponding to the fourth PUCCH format, a quantity of REs carrying the UCI and a frequency hopping configuration parameter of the fourth PUCCH format; the frequency hopping configuration parameter includes: a parameter of enabling a frequency hopping for a PUCCH or a parameter of not enabling a frequency hopping for a PUCCH;

calculate the uplink power adjustment value according to the bit quantity of the UCI, the quantity of the REs and the frequency hopping configuration parameter of the fourth PUCCH format.

Optionally, the computer program is executed by the processor to:

in the case that the bit quantity of UCI is greater than 2 and less than or equal to 11, calculate the uplink power adjustment value by the following formula:

$$\Delta_{PUCCH\_TF,c}(i) = 10 \log_{10}\left(\frac{k * O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value, where a value of k is related to the frequency hopping configuration parameter of the fourth PUCCH format, or the value of k is not related to the frequency hopping configuration parameter of the fourth PUCCH format;

in the case that the bit quantity of UCI is greater than 11, calculate the uplink power adjustment value by the following formula:

$$\Delta_{PUCCH\_TF,c}(i) = 10 \log_{10}\left(\frac{O_{UCI}}{2} * 2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers;

in the case that the value of k is related to the frequency hopping configuration parameter of the fourth PUCCH format, a value range of k includes:

in the case that the frequency hopping is not enabled for the fourth PUCCH format, k is greater than or equal to 7 and less than or equal to 9;

in the case that the frequency hopping is enabled for the fourth PUCCH format, k is greater than or equal to 3 and less than 5;

or in the case that the value of k is not related to the frequency hopping configuration parameter of the fourth PUCCH format, k is greater than or equal to 3, and less than or equal to 9.

Optionally, the fourth PUCCH format includes two PUCCH formats of supporting user multiplexing and not supporting user multiplexing.

Optionally, the uplink channel format is a third PUCCH format or a fourth PUCCH format;

where the third PUCCH format is a short PUCCH format of more than 2 bits, and the fourth PUCCH format is a long PUCCH format of more than 2 bits;

the computer program is executed by the processor to:

acquire a bit quantity of a UCI corresponding to a PUCCH format and a quantity of REs carrying the UCI;

calculate the uplink power adjustment value according to the bit quantity of the UCI and the quantity of the REs.

Optionally, the computer program is executed by the processor to:

in the case that the bit quantity of the UCI is greater than 2 and less than or equal to 11, calculate the uplink power adjustment value by the following formula:

$$\Delta_{PUCCH\_TF,c}(i) = 10 \log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs;

in the case that the PUCCH is in the third PUCCH format, $N_{RE}=\frac{2}{3}*N_{symb}^{PUCCH}*M_{SC}^{PUCCH}$;

in the case that the PUCCH is in the fourth PUCCH format, $N_{RE}=(N_{symb}^{PUCCH}-N_{DMRS-symb}^{PUCCH})*M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value.

Optionally, the bandwidth occupied by the PUCCH is represented by a quantity of subcarriers, and k is greater than or equal to 3 and less than or equal to 9.

A computer-readable storage medium storing a computer program is further provided in the present disclosure, where the computer program is executed by the processor to perform the uplink power control method hereinabove.

According to the present disclosure, the uplink power adjustment value is calculated by acquiring the uplink transmission parameters corresponding to the uplink channel format in the NR, so that the calculated uplink power adjustment value may be adapted to the uplink channel format in the NR, thereby enabling the control of the uplink power to be adapted to the uplink channel format of NR, and ensuring the transmission performance of the uplink channel in the NR.

BRIEF DESCRIPTION OF THE DRAWINGS

In order to more clearly explain the technical solutions of the embodiments of the present disclosure, the drawings to be used in the embodiments of the present disclosure will be briefly described below. Obviously, the drawings in the following description are only some embodiments of the present disclosure. Those of ordinary skill in the art may obtain other drawings based on these drawings without any creative work.

DETAILED DESCRIPTION

The technical solutions in the embodiments of the present disclosure will be described clearly and completely in conjunction with the drawings in the embodiments of the present disclosure. Obviously, the described embodiments are part of the embodiments of the present disclosure, but not all of the embodiments.

Based on the embodiments in the present disclosure, all other embodiments obtained by a person of ordinary skill in the art without creative efforts fall within the protection scope of the present disclosure.

The embodiments of the present disclosure will be further described in detail below in conjunction with the drawings and embodiments.

The following embodiments are used to illustrate the present disclosure, but not to limit the scope of the present disclosure.

Figure 1:
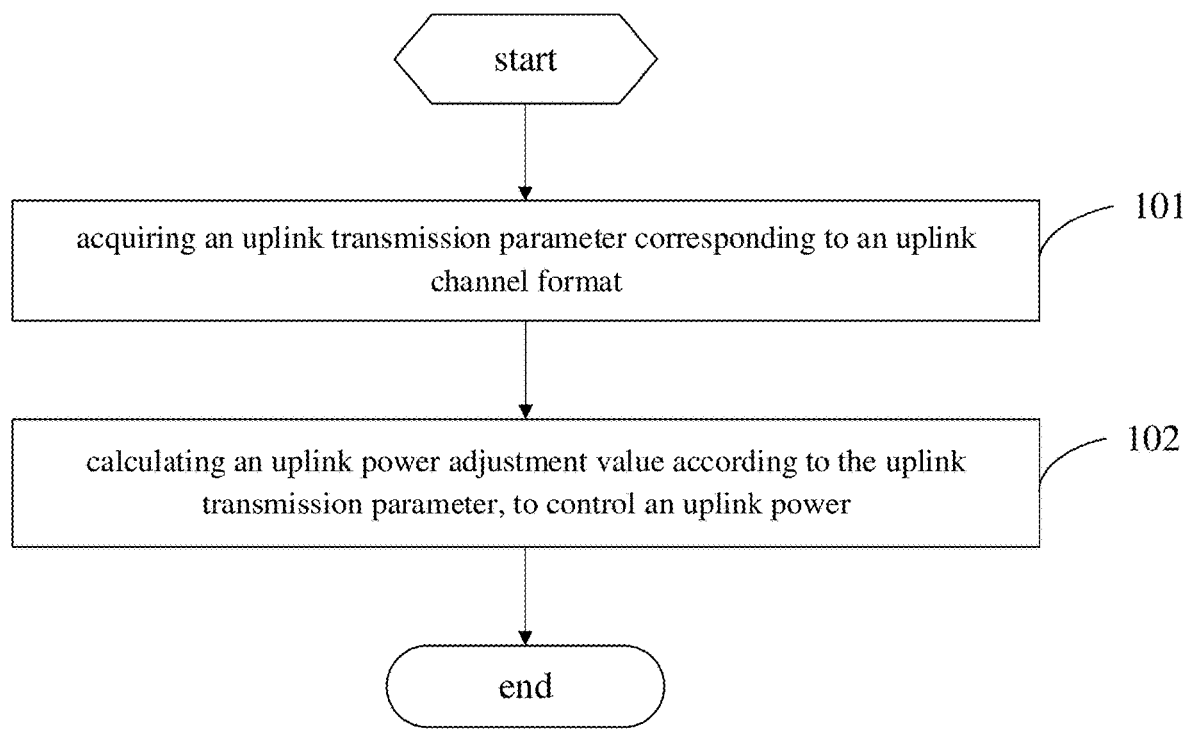
FIG. 1 is a flowchart of an uplink power control method in an embodiment of the present disclosure.

Referring to FIG. 1 which is a flowchart of an uplink power control method in an embodiment of the present disclosure. As shown in FIG. 1, an uplink power control method includes the following steps:

Step 101: acquiring an uplink transmission parameter corresponding to an uplink channel format.

In this step, the mobile communication terminal may obtain the uplink transmission parameters corresponding to the uplink channel format.

The above uplink channel format is the uplink channel format in NR. For different uplink channel formats, the uplink transmission parameters acquired by the mobile communication terminal may be different.

Step 102: calculating an uplink power adjustment value according to the uplink transmission parameter, to control an uplink power.

In this step, the mobile communication terminal may calculate the uplink power adjustment value according to the uplink transmission parameter acquired in step 101, where the uplink power adjustment value is used to perform the uplink power control.

Specifically, the way to control the uplink power by using the uplink power adjustment value can be implemented by using the uplink power control method in LTE described in the background art. To avoid repetition, details are not described in the embodiments of the present disclosure.

The embodiment of the present disclosure is applicable to the control of the uplink transmission power of the mobile communication terminal in the NR. According to the present disclosure, the uplink power adjustment value is calculated by acquiring the uplink transmission parameters corresponding to the uplink channel format in the NR, so that the calculated uplink power adjustment value may be adapted to the uplink channel format in the NR, thereby enabling the control of the uplink power to be adapted to the uplink channel format of NR, and ensuring the transmission performance of the uplink channel in the NR.

The NR supports five new PUCCH formats. The five PUCCH formats are: PUCCH format 0, which is a short PUCCH format of 2 bits or less than 2 bits; PUCCH format 1, which is a long PUCCH format of 2 bits or less than 2 bits; PUCCH format 2, which is a short PUCCH format of more than 2 bits; PUCCH format 3, which is a long PUCCH format of more than 2 bits and does not support multiple user multiplexing; PUCCH format 4, which is a long PUCCH format of more than 2 bits and supports multiple user multiplexing. For the various PUCCH formats described above, the scope of the present disclosure should not be limited by the naming.

In the following, specific description will be made by taking the embodiment of the present disclosure as being adapted to different PUCCH formats in NR as examples.

Figure 2:
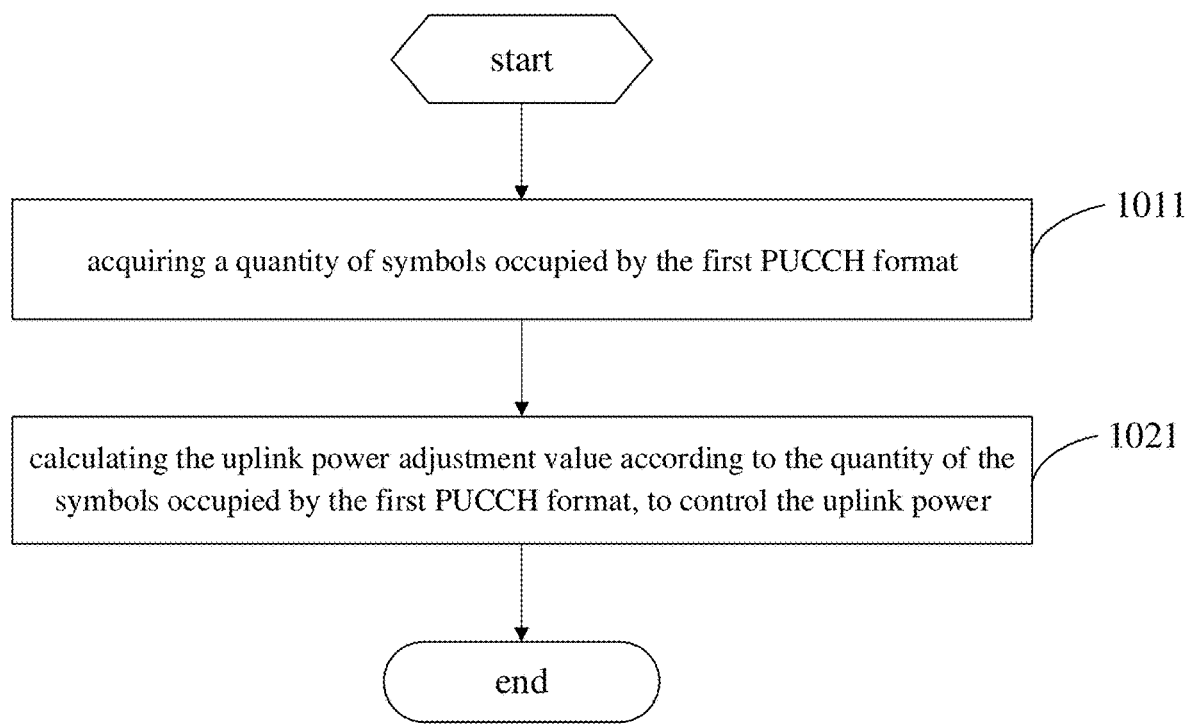
FIG. 2 is a flowchart of another uplink power control method in an embodiment of the present disclosure.

Referring to FIG. 2 which is a flowchart of another uplink power control method in an embodiment of the present disclosure. As shown in FIG. 2, an uplink power control method includes the following steps:

Step 1011: acquiring a quantity of symbols occupied by the first PUCCH format.

The embodiments of the present disclosure are adapted to the first PUCCH format, where the first PUCCH format is a short PUCCH format of 2 bits or less 2 bits than 2 bits. It may be understood that, the first PUCCH format is the PUCCH format 0 among the five PUCCH formats in the NR.

In this step, the mobile communication terminal can obtain the quantity of symbols occupied by the first PUCCH format.

Step 1021: calculating the uplink power adjustment value according to the quantity of the symbols occupied by the first PUCCH format, to control the uplink power.

In this step, the mobile communication terminal may calculate the uplink power adjustment value according to the quantity of symbols occupied by the first PUCCH format acquired in step 1011.

As for how to control the uplink power by using the uplink power adjustment value, reference may be made to the related description in the disclosed embodiment shown in FIG. 1, and to avoid repetition, it will not be repeated here.

Specifically, the calculation of the uplink power adjustment value in step 1021 can be implemented by the following formula:

$$\Delta_{PUCCH\_TF,c}(i) = 10 \log_{10}\left(\frac{N_{ref}}{N_{symb}^{PUCCH}}\right)$$

where $\Delta_{PUCCH\_TF,c}(i)$ is the uplink power adjustment value, $N_{symb}^{PUCCH}$ is the quantity of symbols occupied by the first PUCCH format, and $N_{ref}$ is a reference coefficient corresponding to the first PUCCH format.

Optionally, the value of $N_{ref}$ is a preset value or a value configured for high-layer signaling. If the value of $N_{ref}$ is a preset value, the value of $N_{ref}$ may be but not limited to 1.

For example, suppose that the base station instructs the mobile communication terminal to use PUCCH format 0 for uplink feedback, the bit quantity to be fed back is 1, and the quantity of symbols occupied by PUCCH format 0 is 1.

Then the mobile communication terminal may calculate the power adjustment value corresponding to PUCCH format 0 according to the formula $$\Delta_{PUCCH\_TF,c}(i) = 10 \log_{10}\left(\frac{N_{ref}}{N_{symb}^{PUCCH}}\right),$$

$$N_{ref} = 1, \Delta_{PUCCH\_TF,c}(i) = 10 \log_{10}(1) = 0 \text{ dB}.$$

It can be seen that the control of the uplink power in the embodiment of the present disclosure is adapted with the PUCCH format 0 in the NR, thereby ensuring the transmission performance of the PUCCH format 0 in the NR.

Figure 3:
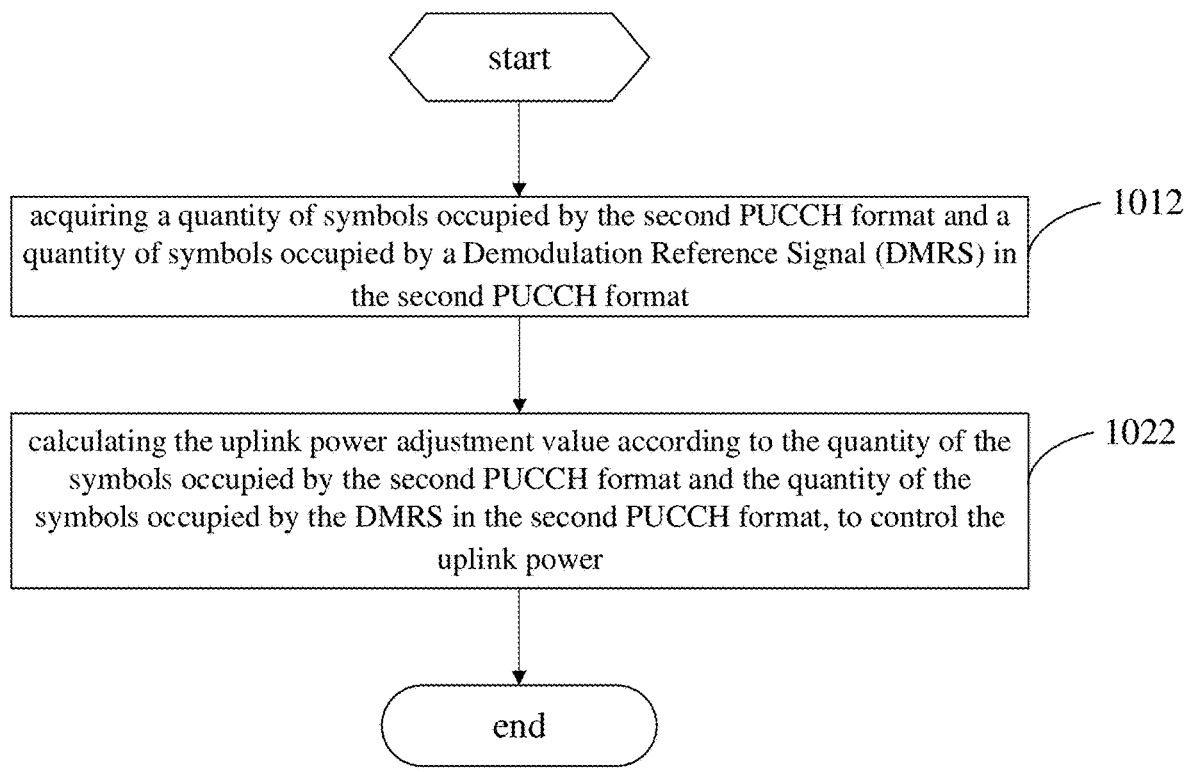
FIG. 3 is a flowchart of another uplink power control method in an embodiment of the present disclosure.

Referring to FIG. 3 which is a flowchart of another uplink power control method in an embodiment of the present disclosure. As shown in FIG. 3, an uplink power control method includes the following steps:

Step 1012: acquiring a quantity of symbols occupied by the second PUCCH format and a quantity of symbols occupied by a Demodulation Reference Signal (DMRS) in the second PUCCH format.

The embodiments of the present disclosure are adapted to the second PUCCH format, where the second PUCCH format is a long PUCCH format of 2 bits or less than 2 bits. It may be understood that, the second PUCCH format is the PUCCH format 1 among the five PUCCH formats in the NR.

In this step, the mobile communication terminal may acquire the quantity of symbols occupied by the second PUCCH format and the quantity of symbols occupied by DMRS in the second PUCCH format.

Step 1022: calculating the uplink power adjustment value according to the quantity of the symbols occupied by the second PUCCH format and the quantity of the symbols occupied by the DMRS in the second PUCCH format, to control the uplink power.

In this step, the mobile communication terminal may calculate the uplink power adjustment value according to the quantity of symbols occupied by the second PUCCH format acquired in step 1012 and the quantity of symbols occupied by the DMRS in the second PUCCH format.

As for how to control the uplink power by using the uplink power adjustment value, reference may be made to the related description in the disclosed embodiment shown in FIG. 1, and to avoid repetition, it will not be repeated here.

Specifically, the calculation of the uplink power adjustment value in step 1022 may be implemented by the following formula:

$$\Delta_{PUCCH\_TF,c}(i) = 10 \log_{10}\left(\frac{N_{ref}}{N_{symb}^{PUCCH} - N_{DMRS\text{-}symb}^{PUCCH}}\right)$$

where $\Delta_{PUCCH\_TF,c}(i)$ is the uplink power adjustment value, $N_{symb}^{PUCCH}$ is the quantity of symbols occupied by the second PUCCH format, $N_{DMRS\text{-}symb}^{PUCCH}$ is the quantity of symbols occupied by the DMRS in the second PUCCH format, and $N_{ref}$ is a reference coefficient corresponding to the second PUCCH format.

Optionally, the value of $N_{ref}$ is a preset value or a value configured for high-layer signaling. If the value of $N_{ref}$ is a preset value, the value of $N_{ref}$ may be but not limited to 2.

For example, suppose the base station instructs the mobile communication terminal to use PUCCH format 1 for uplink feedback. The bit quantity to be fed back is 2, and the quantity of symbols occupied by PUCCH format 1 is 4, which contains a DMRS symbol.

Then the mobile communication terminal can calculate the power adjustment value corresponding to PUCCH format 1 according to the formula $$\Delta_{PUCCH\_TF,c}(i) = 10\log_{10}\left(\frac{N_{ref}}{N_{symb}^{PUcCH} - N_{DMRS\text{-}symb}^{PUccH}}\right),$$

$$N_{symb}^{PUCCH} = 4, N_{DMRS\text{-}symb}^{PUCCH} = 1, N_{ref} = 2,$$

It can be seen that the control of the uplink power in the embodiment of the present disclosure is adapted with the PUCCH format 1 in the NR, thereby ensuring the transmission performance of the PUCCH format 1 in the NR.

Figure 4:
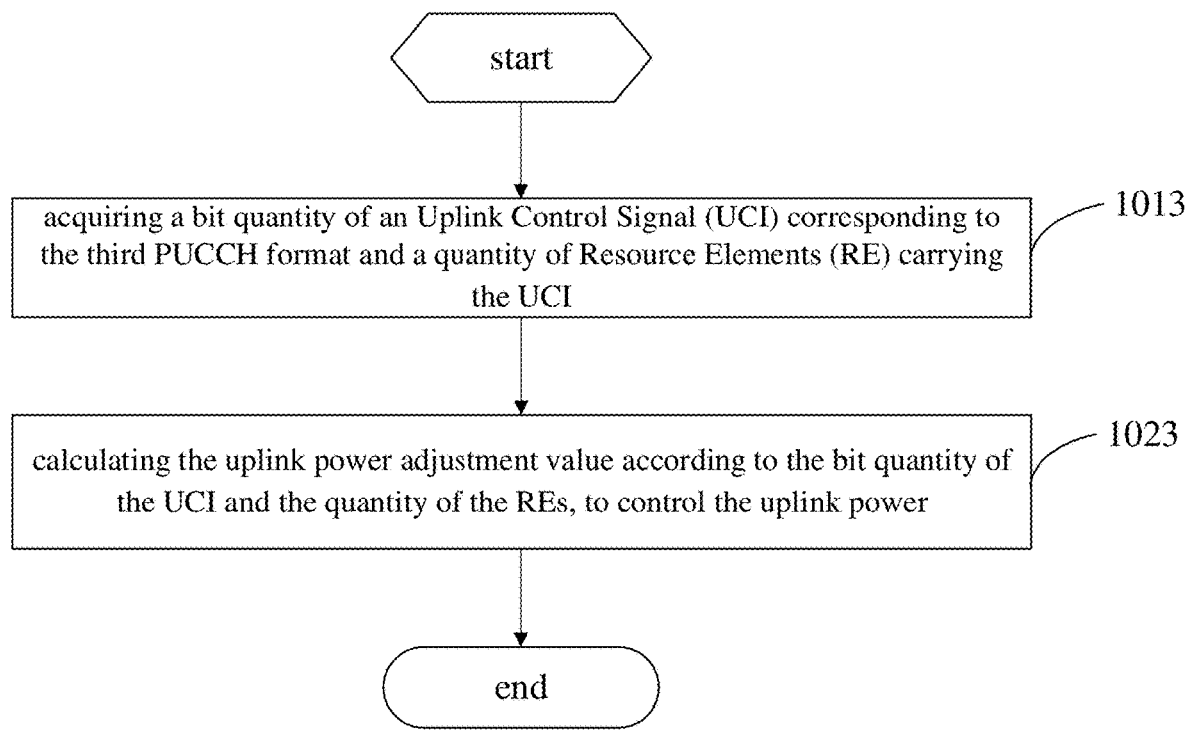
FIG. 4 is a flowchart of another uplink power control method in an embodiment of the present disclosure.

Referring to FIG. 4 which is a flowchart of another uplink power control method in an embodiment of the present disclosure. As shown in FIG. 4, an uplink power control method includes the following steps:

Step 1013: acquiring a bit quantity of an Uplink Control Signal (UCI) corresponding to the third PUCCH format and a quantity of Resource Elements (RE) carrying the UCI.

The embodiments of the present disclosure are adapted to the third PUCCH format, where the third PUCCH format is a short PUCCH format of 2 bits or more than 2 bits. It may be understood that, the third PUCCH format is PUCCH format 2 of the five PUCCH formats in the NR described above.

In this step, the mobile communication terminal may obtain the bit quantity of UCI corresponding to the third PUCCH format and the quantity of REs carrying UCI.

Step 1023: calculating the uplink power adjustment value according to the bit quantity of the UCI and the quantity of the REs, to control the uplink power.

In this step, the mobile communication terminal may calculate the uplink power adjustment value according to the bit quantity of UCI and the quantity of REs acquired in step 1013. The bit quantity of UCI may be greater than 2 and less than or equal to 11, and the bit quantity of UCI may also be greater than 11.

As for how to control the uplink power by using the uplink power adjustment value, reference may be made to the related description in the disclosed embodiment shown in FIG. 1, and to avoid repetition, it will not be repeated here.

Specifically, for the bit quantity of UCI greater than 2 and less than or equal to 11, the calculation of the uplink power adjustment value in step 1023 can be implemented by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs, $N_{RE} = \frac{2}{3} * N_{symb}^{PUCCH} * M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value.

In the case that the bit quantity of the UCI is greater than 11, the calculation of the uplink power adjustment value in step 1023 can be achieved by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, $O_{UCI}$ is the bit quantity of the UCI, and $N_{RE}$ is the quantity of the REs, $N_{RE} = \frac{2}{3} * N_{symb}^{PUCCH} * M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain. $p(N_{RE})$ may be a linear function or a nonlinear function.

Optionally, the bandwidth occupied by the third PUCCH format is represented by the quantity of subcarriers, and the value range of k is greater than or equal to 3 and less than or equal to 7.

For example, suppose that the base station instructs the mobile communication terminal to use PUCCH format 2 for uplink feedback. The bit quantity of UCI to be fed back is 5, the quantity of symbols occupied by PUCCH format 2 is 2, and the number of occupied physical resource blocks (Physical Resource Block, PRB) is 4, that is, the bandwidth occupied by PUCCH format 2 is $M_{SC}^{PUCCH}=4*12=48$.

Then the mobile communication terminal may calculate the power adjustment value corresponding to PUCCH format 2 according to the formula $$\Delta_{PUCCH\_TF,c}(i) = 10\log_{10}\left(\frac{k * O_{UCI}}{N_{RE}}\right),$$

$$O_{UCI} = 5, N_{RE} = \frac{2}{3} * 2 * 48 = 64.$$

When the value of k is 5, $$\Delta_{PUCCH\_TF,c}(i) = 10\log_{10}\left(\frac{5*5}{64}\right) = -4.08 \text{ dB}.$$

It can be seen that the control of the uplink power in the embodiment of the present disclosure is adapted with PUCCH format 2 in NR, thereby ensuring the transmission performance of PUCCH format 2 in NR.

Figure 5:
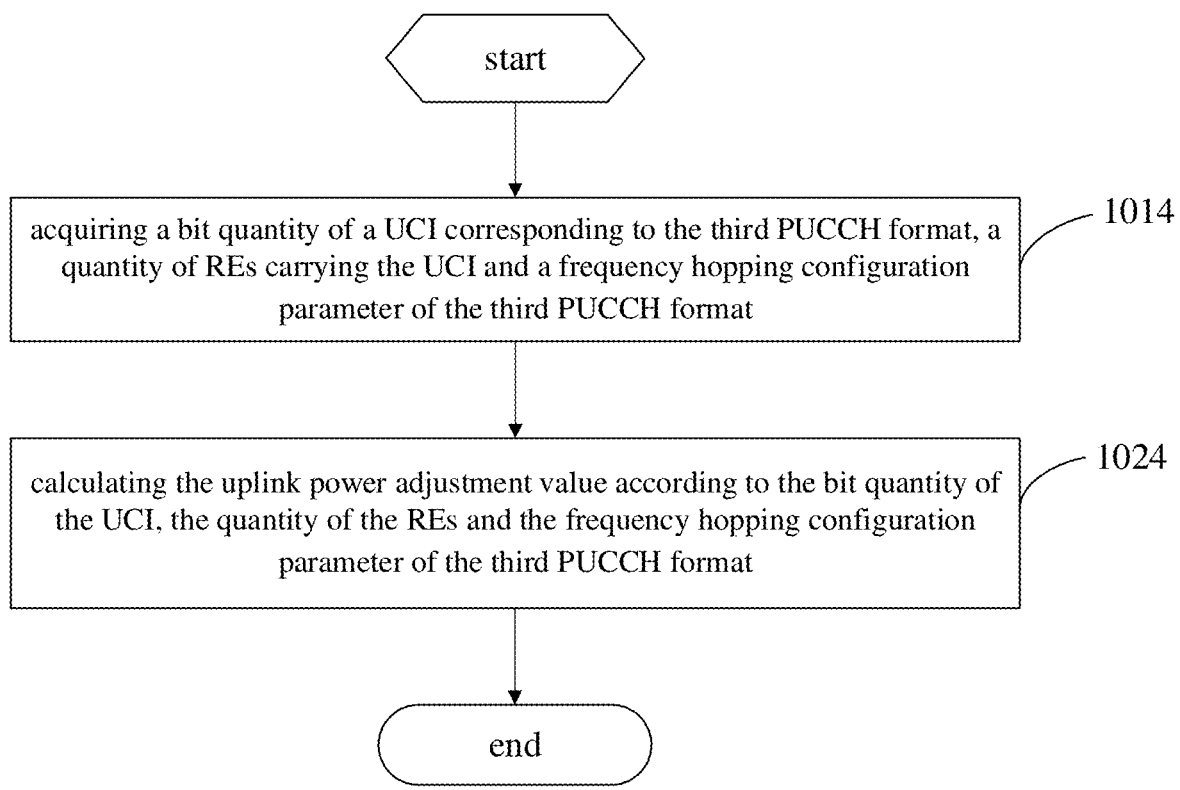
FIG. 5 is a flowchart of another uplink power control method in an embodiment of the present disclosure.

Referring to FIG. 5 which is a flowchart of another uplink power control method in an embodiment of the present disclosure. As shown in FIG. 5, an uplink power control method includes the following steps:

Step 1014: acquiring a bit quantity of a UCI corresponding to the third PUCCH format, a quantity of REs carrying the UCI and a frequency hopping configuration parameter of the third PUCCH format.

The embodiments of the present disclosure are adapted to the third PUCCH format.

In this step, the mobile communication terminal may obtain the bit quantity of UCI corresponding to the third PUCCH format, the quantity of REs carrying UCI, and the frequency hopping configuration parameters of the third PUCCH format.

The frequency hopping configuration parameter is a parameter for configuring PUCCH to enable the frequency hopping, or the frequency hopping configuration parameter is a parameter for configuring PUCCH not to enable the frequency hopping. The frequency hopping configuration parameters can be configured by high layers.

Step 1024: calculating the uplink power adjustment value according to the bit quantity of the UCI, the quantity of the REs and the frequency hopping configuration parameter of the third PUCCH format.

In this step, the mobile communication terminal may calculate the uplink power adjustment value according to the bit quantity of UCI, the quantity of REs and the frequency hopping configuration parameter in the third PUCCH format acquired in step 1014. The bit quantity of UCI may be greater than 2 and less than or equal to 11, and the bit quantity of UCI may also be greater than 11.

As for how to control the uplink power by using the uplink power adjustment value, reference may be made to the related description in the disclosed embodiment shown in FIG. 1, and to avoid repetition, it will not be repeated here.

Specifically, in the case that the bit quantity of UCI is greater than 2 and less than or equal to 11, the calculation of the uplink power adjustment value in step 1024 may be implemented by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value, where a value of k is related to the frequency hopping configuration parameter of the third PUCCH format, or the value of k is not related to the frequency hopping configuration parameter of the third PUCCH format.

In the case that the bit quantity of UCI is greater than 11, the calculation of the uplink power adjustment value in step 1024 can be implemented by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain. $p(N_{RE})$ is a function related to polar coding gain. $p(N_{RE})$ may be a linear function or a nonlinear function.

Optionally, the bandwidth occupied by the third PUCCH format is represented by a quantity of subcarriers;

in the case that the value of k is related to the frequency hopping configuration parameter of the third PUCCH format, a value range of k includes:

in the case that the frequency hopping is not enabled for the third PUCCH format, k is greater than or equal to 5 and less than or equal to 7;

in the case that the frequency hopping is enabled for the third PUCCH format, k is greater than or equal to 3 and less than 5;

or in the case that the value of k is not related to the frequency hopping configuration parameter of the third PUCCH format, k is greater than or equal to 3, and less than or equal to 7.

In this embodiment, for a case where the value of k is related to the frequency hopping configuration parameter in the third PUCCH format, an example is as follows:

For example, suppose that the base station instructs the mobile communication terminal to use PUCCH format 2 without frequency hopping for uplink feedback. The bit quantity of UCI to be fed back is 5, the quantity of symbols occupied by PUCCH format 2 is 2, and the number of occupied PRBs is 4, namely PUCCH format 2 occupies bandwidth $M_{SC}^{PUCCH}=4*12=48$.

Then the mobile communication terminal can calculate the power adjustment value corresponding to PUCCH format 2 without frequency hopping according to the formula $$\Delta_{PUCCH\_TF,c}(i) = 10\log_{10}\left(\frac{k * O_{UCI}}{N_{RE}}\right) O_{UCI} = 5$$

$$N_{RE} = \frac{2}{3}*2*48 = 64.$$

When the value of k is 6.64, $$\Delta_{PUCCH\_TF,c}(i) = 10\log_{10}\left(\frac{5*6.64}{64}\right) = -2.8504 \text{ dB}.$$

For another example, suppose that the base station instructs the mobile communication terminal to use PUCCH format 2 with frequency hopping to perform uplink feedback. The bit quantity of UCI to be fed back is 5, the quantity of symbols occupied by PUCCH format 2 is 2, and the number of occupied PRBs is 4, namely PUCCH format 2 occupies bandwidth $M_{SC}^{PUCCH}=4*12=48$.

Then the mobile communication terminal can calculate the power adjustment value corresponding to PUCCH format 2 with frequency hopping enabled according to the formula $$\Delta_{PUCCH\_TF,c}(i) = 10\log_{10}\left(\frac{k * O_{UCI}}{N_{RE}}\right), O_{UCI} = 5,$$

$$N_{RE} = \frac{2}{3}*2*48 = 64.$$

When the value of k is 4, $$\Delta_{PUCCH\_TF,c}(i) = 10\log_{10}\left(\frac{5*4}{64}\right) = -5.0515 \text{ dB}.$$

In this embodiment, for the case where the value of k is not related to the frequency hopping configuration parameter in the third PUCCH format, for example, regardless of whether frequency hopping is enabled for PUCCH format 2, k is the same preset value, assuming that k is preset, k is 5.3472.

Assuming that the base station instructs the mobile communication terminal to use PUCCH format 2 for uplink feedback. The bit quantity of UCI to be fed back is 8, the quantity of symbols occupied by PUCCH format 2 is 2, and the number of occupied PRBs is 2, that is, the bandwidth occupied by PUCCH format 2 is $M_{SC}^{PUCCH}=2*12=24$.

Then the mobile communication terminal may calculate the power adjustment value corresponding to PUCCH format 2 according to the formula $$\Delta_{PUCCH\_TF,c}(i) = 10 \log_{10}\left(\frac{k*O_{UCI}}{N_{RE}}\right), O_{UCI} = 8,$$

$$N_{RE} = \frac{2}{3}*2*24 = 32,$$

the value of k is 5.3472 regardless of whether frequency hopping is enabled or not, $$\Delta_{PUCCH\_TF,c}(i) = 10 \log_{10}\left(\frac{8*5.3472}{32}\right) = 1.2607 \text{ dB}.$$

It can be seen that the control of the uplink power in the embodiment of the present disclosure is adapted with PUCCH format 2 in NR, thereby ensuring the transmission performance of PUCCH format 2 in NR.

Figure 6:
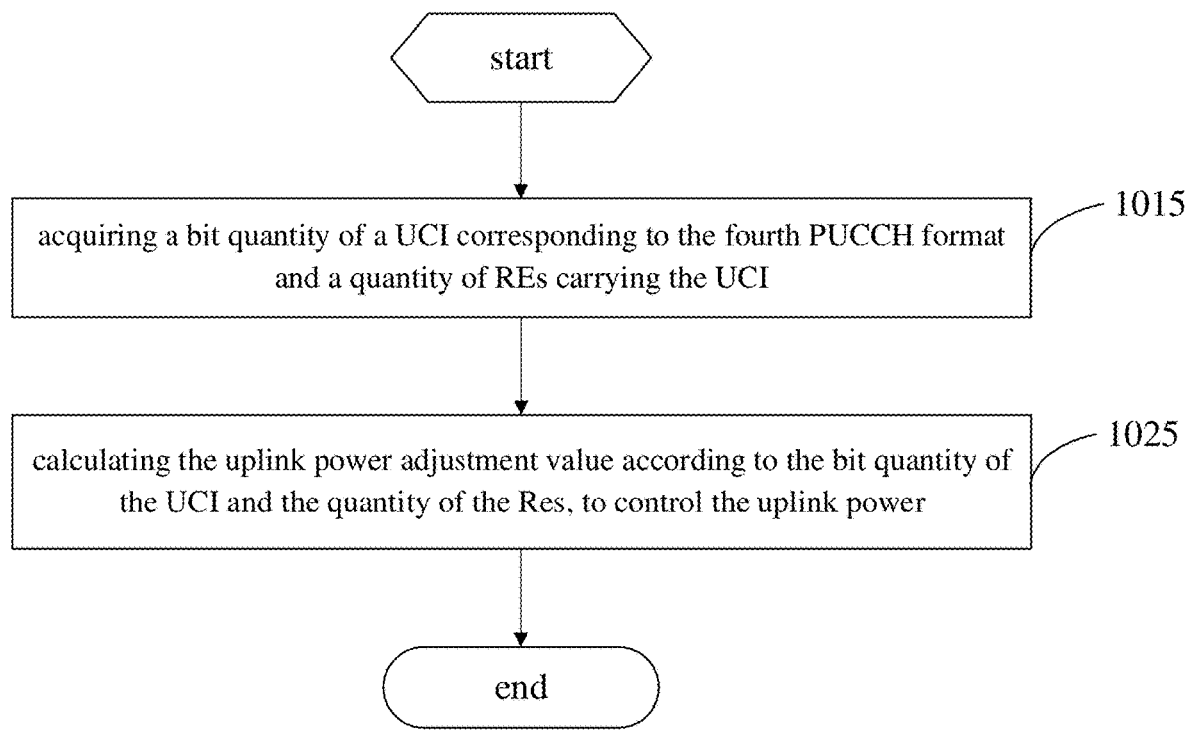
FIG. 6 is a flowchart of another uplink power control method in an embodiment of the present disclosure.

Referring to FIG. 6 which is a flowchart of another uplink power control method in an embodiment of the present disclosure. As shown in FIG. 6, an uplink power control method includes the following steps:

Step 1015: acquiring a bit quantity of a UCI corresponding to the fourth PUCCH format and a quantity of REs carrying the UCI.

The embodiments of the present disclosure are adapted to the fourth PUCCH format, where the fourth PUCCH format is a long PUCCH format of 2 bits or more, and the fourth PUCCH format may include two types of PUCCH formats of supporting user multiplexing and not user multiplexing. It may be understood that, the fourth PUCCH format includes PUCCH format 3 and PUCCH format 4 of the five PUCCH formats in the NR described above.

In this step, the mobile communication terminal may obtain the bit quantity of UCI corresponding to the fourth PUCCH format and the quantity of REs carrying UCI.

Step 1025: calculating the uplink power adjustment value according to the bit quantity of the UCI and the quantity of the REs.

In this step, the mobile communication terminal may calculate the uplink power adjustment value according to the bit quantity of UCI acquired in step 1015 and the quantity of REs. The bit quantity of UCI may be greater than 2 and less than or equal to 11, and the bit quantity of UCI may also be greater than 11.

As for how to control the uplink power by using the uplink power adjustment value, reference may be made to the related description in the disclosed embodiment shown in FIG. 1, and to avoid repetition, it will not be repeated here.

Specifically, in the case that the bit quantity of UCI is greater than 2 and less than or equal to 11, the calculation of the uplink power adjustment value in step 1025 may be implemented by the following formula:

$$\Delta_{PUCCH\_TF,c}(i) = 10 \log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value;

in the case that the bit quantity of the UCI is greater than 11, calculating the uplink power adjustment value by the following formula:

$$\Delta_{PUCCH\_TF,c}(i) = 10 \log_{10}\left(\frac{O_{UCI}}{2}*2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by the DMRS in the fourth PUCCH format, $M_{SC}^{PUCCH}$ is a bandwidth occupied by the fourth PUCCH format, and $p(N_{RE})$ is a function related to polar coding gain. $p(N_{RE})$ is a linear function or a nonlinear function.

Optionally, the bandwidth occupied by the fourth PUCCH format is represented by the quantity of subcarriers, and the value range of k is greater than or equal to 3 and less than or equal to 9.

For example, suppose that the base station instructs the mobile communication terminal to use PUCCH format 4 for uplink feedback. The bit quantity of UCI to be fed back is 30, and the quantity of symbols occupied by PUCCH format 4 is 14. Among them, the quantity of symbols occupied by DMRS is 2, and the number of occupied PRB is 1. The bandwidth occupied by PUCCH format 4 is $M_{SC}^{PUCCH}=1*12=12$ Then the mobile communication terminal may calculate the power adjustment value corresponding to PUCCH format 4 according to the formula $$\Delta_{PUCCH\_TF,c}(i) = 10 \log_{10}\left(\frac{O_{UCI}}{2}*2^{-p(N_{RE})}\right),$$

$$O_{UCI} = 30, N_{RE} = 12*12 = 144,$$

$$\Delta_{PUCCH\_TF,c}(i) = 10 \log_{10}(30*2^{-p(144)}).$$

Assuming that when p (144)=1.25*144= 180 $\Delta_{PUCCH\_TF,c}(i)$=−530.1 dB.

It can be seen that the control of the uplink power in the embodiment of the present disclosure is adapted with PUCCH format 3 and PUCCH format 4 in NR, thereby ensuring the transmission performance of PUCCH format 3 and PUCCH format 4 in NR.

Figure 7:
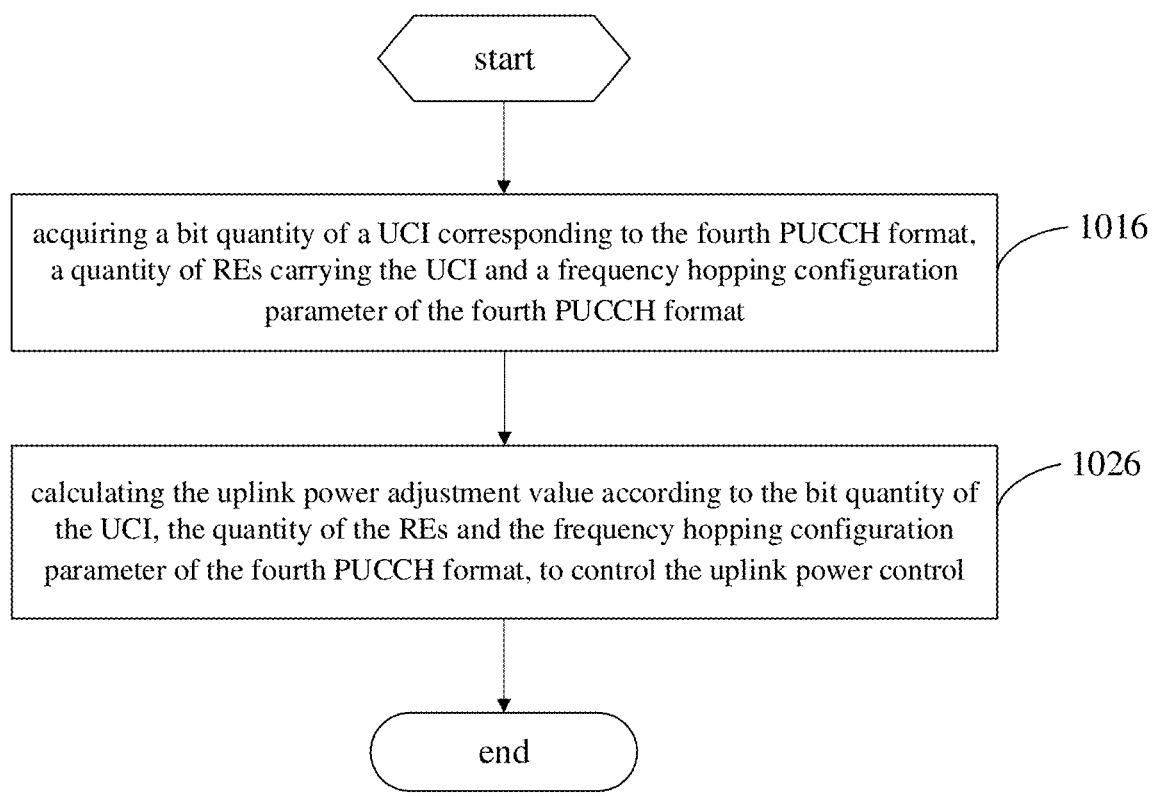
FIG. 7 is a flowchart of another uplink power control method in an embodiment of the present disclosure.

Referring to FIG. 7 which is a flowchart of another uplink power control method in an embodiment of the present disclosure. As shown in FIG. 7, an uplink power control method includes the following steps:

Step 1016: acquiring a bit quantity of a UCI corresponding to the fourth PUCCH format, a quantity of REs carrying the UCI and a frequency hopping configuration parameter of the fourth PUCCH format.

The embodiments of the present disclosure are adapted to the fourth PUCCH format.

In this step, the mobile communication terminal may obtain the bit quantity of UCI corresponding to the fourth PUCCH format, the quantity of REs carrying UCI, and the frequency hopping configuration parameters of the fourth PUCCH format.

The frequency hopping configuration parameter is a parameter for configuring PUCCH to enable frequency hopping, or the frequency hopping configuration parameter is a parameter for configuring PUCCH to not enable frequency hopping. The frequency hopping configuration parameters can be configured by high layers.

Step 1026: calculating the uplink power adjustment value according to the bit quantity of the UCI, the quantity of the REs and the frequency hopping configuration parameter of the fourth PUCCH format, to control the uplink power control.

In this step, the mobile communication terminal may calculate the uplink power adjustment value according to the bit quantity of UCI, the quantity of REs, and the frequency hopping configuration parameter in the fourth PUCCH format acquired in step 1016. The bit quantity of UCI may be greater than 2 and less than or equal to 11, and the bit quantity of UCI may also be greater than 11.

As for how to control the uplink power by using the uplink power adjustment value, reference may be made to the related description in the disclosed embodiment shown in FIG. 1, and to avoid repetition, it will not be repeated here.

Specifically, in the case that the bit quantity of UCI is greater than 2 and less than or equal to 11, the calculation of the uplink power adjustment value in step 1026 may be implemented by the following formula:

$$\Delta_{PUCCH\_TF,c}(i) = 10 \log_{10}\left(\frac{k*O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value, where a value of k is related to the frequency hopping configuration parameter of the fourth PUCCH format, or the value of k is not related to the frequency hopping configuration parameter of the fourth PUCCH format.

In the case that the bit quantity of UCI is greater than 11, the calculation of the uplink power adjustment value in step 1026 can be implemented by the following formula:

$$\Delta_{PUCCH\_TF,c}(i) = 10 \log_{10}\left(\frac{O_{UCI}}{2} * 2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $M_{SC}^{PUCCH}$ is a bandwidth occupied by the fourth PUCCH format, and $p(N_{RE})$ is a function related to polar coding gain. $p(N_{RE})$ is a linear function or a nonlinear function.

Optionally, the bandwidth occupied by the fourth PUCCH format is represented by the quantity of subcarriers;

When the value of k is related to the frequency hopping configuration parameter in the fourth PUCCH format, the value range of k includes:

in the case that the value of k is related to the frequency hopping configuration parameter of the fourth PUCCH format, a value range of k includes:

in the case that the frequency hopping is not enabled for the fourth PUCCH format, k is greater than or equal to 7 and less than or equal to 9;

in the case that the frequency hopping is enabled for the fourth PUCCH format, k is greater than or equal to 3 and less than 5;

or in the case that the value of k is not related to the frequency hopping configuration parameter of the fourth PUCCH format, k is greater than or equal to 3, and less than or equal to 9.

In this embodiment, for the case where the value of k is related to the frequency hopping configuration parameter in the fourth PUCCH format:

for example, suppose that the base station instructs the mobile communication terminal to use PUCCH format 3 without frequency hopping for uplink feedback. The bit quantity of UCI to be fed back is 10, and the quantity of symbols occupied by PUCCH format 3 is 14, where the quantity of symbols occupied by DMRS is 2, The number of occupied PRBs is 1, that is, the bandwidth occupied by PUCCH format 3 is $M_{SC}^{PUCCH}=1*12=12$.

Then the mobile communication terminal can calculate the power adjustment value corresponding to PUCCH format 3 without frequency hopping according to the formula $$\Delta_{PUCCH\_TF,c}(i) = 10 \log_{10}\left(\frac{k*O_{UCI}}{N_{RE}}\right), O_{UCI} = 10,$$

$$N_{RE} = 12*12 = 144,$$

$$\Delta_{PUCCH\_TF,c}(i) = 10\log_{10}\left(\frac{k*10}{144}\right).$$

When the value of k is 7.8, $\Delta_{PUCCH\_TF,c}(i)=-2.6627$ dB.

For another example, suppose that the base station instructs the mobile communication terminal to use PUCCH format 3 with frequency hopping for uplink feedback. The bit quantity of UCI to be fed back is 10, and the quantity of symbols occupied by PUCCH format 3 is 14, where the quantity of symbols occupied by DMRS is 2, the number of occupied PRBs is 1, that is, the bandwidth occupied by PUCCH format 3 is $M_{SC}^{PUCCH}=1*12=12$.

Then the mobile communication terminal can calculate the power adjustment value corresponding to PUCCH format 3 with frequency hopping enabled according to the formula $$\Delta_{PUCCH\_TF,c}(i) = 10\log_{10}\left(\frac{k*O_{UCI}}{N_{RE}}\right), O_{UCI} = 10,$$

$$N_{RE} = 12*12 = 144, \Delta_{PUCCH\_TF,c}(i) = 10\log_{10}\left(\frac{k*10}{144}\right).$$

When the value of k is 3.4, $\Delta_{PUCCH\_TF,c}(i)=-6.2688$ dB.

For another example, suppose that the base station instructs the mobile communication terminal to use PUCCH format 4 for uplink feedback. The bit quantity of UCI to be fed back is 30, and the quantity of symbols occupied by PUCCH format 4 is 14, where the quantity of symbols occupied by DMRS is 2 and the quantity of the occupied PRBs is 1, that is, the bandwidth occupied by PUCCH format 4 is $M_{SC}^{PUCCH}=1*12=12$.

Then the mobile communication terminal may calculate the power adjustment value corresponding to PUCCH format 4 according to the formula $$\Delta_{PUCCH\_TF,c}(i) = 10\log_{10}\left(\frac{O_{UCI}}{2} * 2^{-p(N_{RE})}\right) O_{UCI}, = 30,$$

$$N_{RE} = 12*12 = 144, \Delta_{PUCCH\_TF,c}(i) = 10\log_{10}(30*2^{-p(144)}).$$

Assuming that when $p(144)=1.25*144=180$, $\Delta_{PUCCH\_TF,c}(i)=-530.1$ dB.

For a case where the value of k is not related to the frequency hopping configuration parameter in the fourth PUCCH format, for example, regardless of whether frequency hopping is enabled in PUCCH format 3, k is the same preset value, assuming that the preset k is 4.4785.

Assume that the base station instructs the mobile communication terminal to use PUCCH format 3 for uplink feedback. The bit quantity of UCI to be fed back is 10, and the quantity of symbols occupied by PUCCH format 3 is 14, of which the quantity of symbols occupied by DMRS is 2 and the quantity of occupied PRBs is 1, that is, the bandwidth occupied by PUCCH format 3 is $M_{SC}^{PUCCH}=1*12=12$.

Then the mobile communication terminal may calculate the power adjustment value corresponding to PUCCH format 3 according to the formula $$\Delta_{PUCCH\_TF,c}(i) = 10\log_{10}\left(\frac{k*O_{UCI}}{N_{RE}}\right), O_{UCI} = 10,$$

$$N_{RE} = 12*12 = 144, \Delta_{PUCCH\_TF,c}(i) = 10\log_{10}\left(\frac{k*10}{144}\right).$$

The value of k is 4.4785 regardless of whether frequency hopping is enabled, $\Delta_{PUCCH\_TF,c}(i)=-5.0723$ dB.

It can be seen that the control of the uplink power in the embodiment of the present disclosure is adapted with PUCCH format 3 and PUCCH format 4 in NR, thereby ensuring the transmission performance of PUCCH format 3 and PUCCH format 4 in NR.

Figure 8:
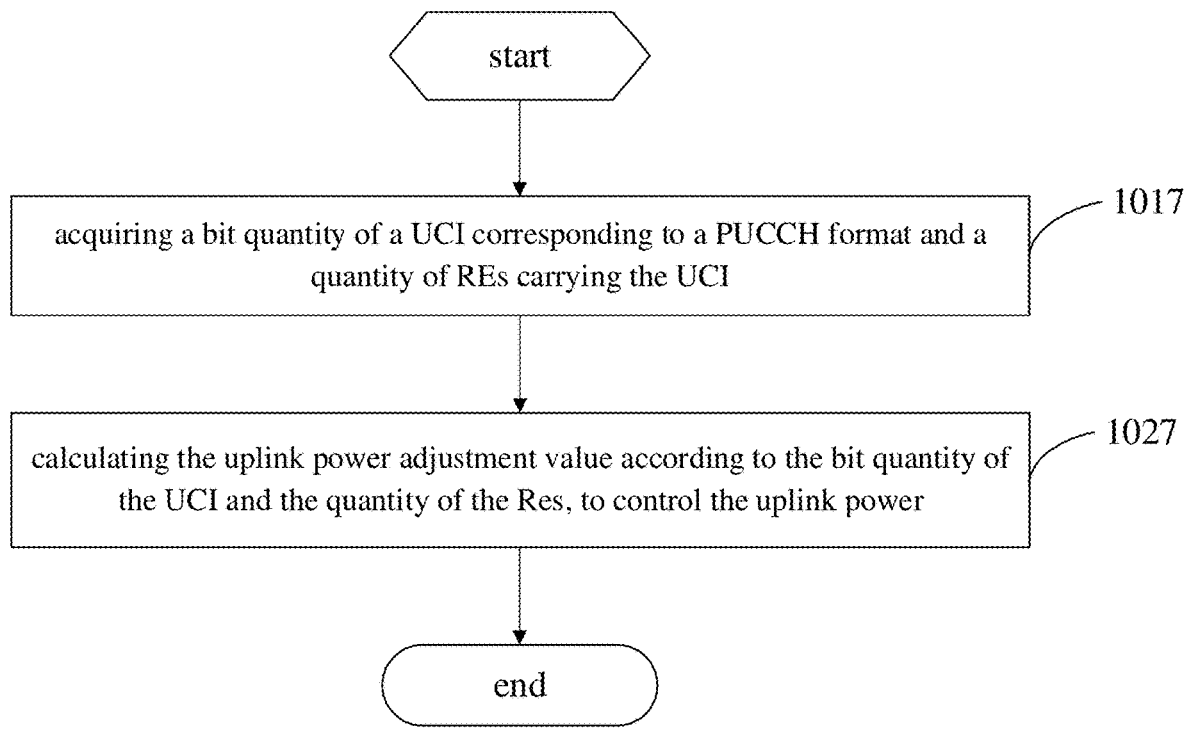
FIG. 8 is a flowchart of another uplink power control method in an embodiment of the present disclosure.

Referring to FIG. 8 which is a flowchart of another uplink power control method in an embodiment of the present disclosure. As shown in FIG. 8, the uplink channel format is a third PUCCH format or a fourth PUCCH format; the third PUCCH format is a short PUCCH format of more than 2 bits, and the fourth PUCCH format is a long PUCCH format of more than 2 bits; the method includes the following steps:

Step 1017: acquiring a bit quantity of a UCI corresponding to a PUCCH format and a quantity of REs carrying the UCI.

The embodiments of the present disclosure are applicable to both the third PUCCH format and the fourth PUCCH format.

In this step, the mobile communication terminal may obtain the bit quantity of UCI corresponding to the PUCCH and the quantity of REs carrying UCI.

Step 1027: calculating the uplink power adjustment value according to the bit quantity of the UCI and the quantity of the REs.

In this step, the mobile communication terminal may calculate the uplink power adjustment value according to the bit quantity of UCI and the quantity of REs acquired in step 1017.

The bit quantity of UCI may be greater than 2 and less than or equal to 11, and the bit quantity of UCI may also be greater than 11.

As for how to control the uplink power by using the uplink power adjustment value, reference may be made to the related description in the disclosed embodiment shown in FIG. 1, and to avoid repetition, it will not be repeated here.

Specifically, in the case that the bit quantity of UCI is greater than 2 and less than or equal to 11, the calculation of the uplink power adjustment value in step 1027 can be implemented by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs;

in the case that the PUCCH is in the third PUCCH format, $N_{RE}=\frac{2}{3}*N_{symb}^{PUCCH}*M_{SC}^{PUCCH}$; in the case that the PUCCH is in the fourth PUCCH format, $N_{RE}=(N_{symb}^{PUCCH}-N_{DMRS-symb}^{PUCCH})*M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value In the embodiment of the present disclosure, regardless of whether the PUCCH format is the third PUCCH format or the fourth PUCCH format, the value of k is the same.

Optionally, the bandwidth occupied by the PUCCH is represented by the quantity of subcarriers, and the value range of k is greater than or equal to 3 and less than or equal to 9.

For example, for PUCCH format 2, PUCCH format 3, and PUCCH format 4, a unique value of k is preset, assuming that the preset k is 5.1286.

Suppose the base station instructs the mobile communication terminal to use PUCCH format 2 for uplink feedback. The bit quantity of UCI to be fed back is 5, the quantity of symbols occupied by PUCCH format 2 is 2, and the number of occupied PRBs is 2, that is, the bandwidth occupied by PUCCH format 2 is $M_{SC}^{PUCCH}=2*12=24$.

Then the mobile communication terminal can calculate the power adjustment value corresponding to PUCCH format 2 according to formula $$\Delta_{PUCCH\_TF,c}(i) = 10\log_{10}\left(\frac{k*O_{UCI}}{N_{RE}}\right), O_{UCI} = 6, N_{RE} = \frac{2}{3}*2*24 = 32,$$

$$\Delta_{PUCCH\_TF,c}(i) = 10\log_{10}\left(\frac{6*5.1286}{32}\right) = -0.17 \text{ dB}.$$

Similarly, suppose that the base station instructs the mobile communication terminal to use PUCCH format 3 for uplink feedback. The bit quantity of UCI to be fed back is 10, and the quantity of symbols occupied by PUCCH format 3 is 14, of which the quantity of symbols occupied by DMRS is 2, and the number of occupied PRB is 1, that is, the bandwidth occupied by PUCCH format 3 is $M_{SC}^{PUCCH}=1*12=12$.

Then the mobile communication terminal can calculate the power adjustment value corresponding to PUCCH format 3 according to the formula $$\Delta_{PUCCH\_TF,c}(i) = 10\log_{10}\left(\frac{k*O_{UCI}}{N_{RE}}\right), O_{UCI} = 10, N_{RE} = 12*12 = 144,$$

$$\Delta_{PUCCH\_TF,c}(i) = 10\log_{10}\left(\frac{k*10}{144}\right) = 10\log_{10}\left(\frac{5.1286*10}{144}\right) = -4.4836 \text{ dB}.$$

It can be seen that the control of the uplink power in the embodiment of the present disclosure is adapted with PUCCH format 2, PUCCH format 3 and PUCCH format 4 in NR, thereby ensuring the transmission performance of PUCCH format 2, PUCCH format 3 and PUCCH format 4 in NR.

Figure 9:
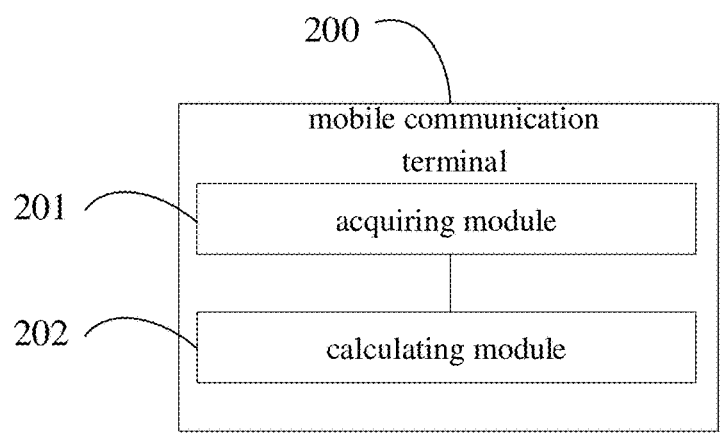
FIG. 9 is a structural diagram of a mobile communication terminal in an embodiment of the present disclosure.

Referring to FIG. 9 which is a schematic structural diagram of a mobile communication terminal in an embodiment of the present disclosure. As shown in FIG. 9, the mobile communication terminal 200 includes:

an acquiring module 201, configured to acquire an uplink transmission parameter corresponding to an uplink channel format;

a calculating module 202, configured to calculate an uplink power adjustment value according to the uplink transmission parameter, to control an uplink power.

Optionally, the uplink channel format is a first Physical Uplink Control Channel (PUCCH) format, and the first PUCCH format is a short PUCCH format of 2 bits or less than 2 bits;

the acquiring module 201 is further configured to:

acquire a quantity of symbols occupied by the first PUCCH format;

the calculating module 202 is further configured to:

calculate the uplink power adjustment value according to the quantity of the symbols occupied by the first PUCCH format, to control the uplink power.

Optionally, the calculating module 202 is further configured to:

calculate the uplink power adjustment value by the following formula:

$$\Delta_{PUCCH\_TF,c}(i) = 10\log_{10}\left(\frac{N_{ref}}{N_{symb}^{PUCCH}}\right);$$

where $\Delta_{PUCCH\_TF,c}(i)$ is the uplink power adjustment value, $N_{symb}^{PUCCH}$ is the quantity of symbols occupied by the first PUCCH format, and $N_{ref}$ is a reference coefficient corresponding to the first PUCCH format.

Optionally, a value of $N_{ref}$ is a preset value or a value configured by a high-layer signaling.

Optionally, the uplink channel format is a second PUCCH format, and the second PUCCH format is a long PUCCH format of 2 bits or less than 2 bits;

the acquiring module 201 is further configured to:

acquire a quantity of symbols occupied by the second PUCCH format and a quantity of symbols occupied by a Demodulation Reference Signal (DMRS) in the second PUCCH format;

the calculating module 202 is further configured to:

calculate the uplink power adjustment value according to the quantity of the symbols occupied by the second PUCCH format and the quantity of the symbols occupied by the DMRS in the second PUCCH format, to control the uplink power.

Optionally, the calculating module 202 is further configured to:

calculate the uplink power adjustment value by the following formula:

$$\Delta_{PUCCH\_TF,c}(i) = 10\log_{10}\left(\frac{N_{ref}}{N_{symb}^{PUCCH} - N_{DMRS-symb}^{PUCCH}}\right);$$

where $\Delta_{PUCCH\_TF,c}(i)$ is the uplink power adjustment value, $N_{symb}^{PUCCH}$ is the quantity of symbols occupied by the second PUCCH format, $N_{DMRS-symb}^{PUCCH}$ is the quantity of symbols occupied by the DMRS in the second PUCCH format, and $N_{ref}$ is a reference coefficient corresponding to the second PUCCH format.

Optionally, a value of $N_{ref}$ is a preset value or a value configured by a high-layer signaling.

Optionally, the uplink channel format is a third PUCCH format, and the third PUCCH format is a short PUCCH format of more than 2 bits;

the acquiring module 201 is further configured to:

acquire a bit quantity of an Uplink Control Signal (UCI) corresponding to the third PUCCH format and a quantity of Resource Elements (RE) carrying the UCI;

the calculating module 202 is further configured to:

calculate the uplink power adjustment value according to the bit quantity of the UCI and the quantity of the REs, to control the uplink power.

Optionally, the calculating module 202 is further configured to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value;

the calculating module is 202 further configured to:

in the case that the bit quantity of the UCI is greater than 11, calculate the uplink power adjustment value by the following formula:

$$\Delta_{PUCCH\_TF,c}(i) = 10\log_{10}\left(\frac{O_{UCI}}{2}*2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers, and k is greater than or equal to 3 and less than or equal to 7.

Optionally, the uplink channel format is a third PUCCH format, and the third PUCCH format is a short PUCCH format of more than 2 bits;

the acquiring module 201 is further configured to:

acquire a bit quantity of a UCI corresponding to the third PUCCH format, a quantity of REs carrying the UCI and a frequency hopping configuration parameter of the third PUCCH format; the frequency hopping configuration parameter includes: a parameter of enabling a frequency hopping for a PUCCH or a parameter of not enabling a frequency hopping for a PUCCH;

the calculating module 202 is further configured to:

calculate the uplink power adjustment value according to the bit quantity of the UCI, the quantity of the REs and the frequency hopping configuration parameter of the third PUCCH format.

Optionally, the calculating module 202 is further configured to:

in the case that the bit quantity of UCI is greater than 2 and less than or equal to 11, calculate the uplink power adjustment value by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value, where a value of k is related to the frequency hopping configuration parameter of the third PUCCH format, or the value of k is not related to the frequency hopping configuration parameter of the third PUCCH format;

the calculating module 202 is further configured to:

in the case that the bit quantity of UCI is greater than 11, calculate the uplink power adjustment value by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers;

in the case that the value of k is related to the frequency hopping configuration parameter of the third PUCCH format, a value range of k includes:

in the case that the frequency hopping is not enabled for the third PUCCH format, k is greater than or equal to 5 and less than or equal to 7;

in the case that the frequency hopping is enabled for the third PUCCH format, k is greater than or equal to 3 and less than 5;

or in the case that the value of k is not related to the frequency hopping configuration parameter of the third PUCCH format, k is greater than or equal to 3, and less than or equal to 7.

Optionally, the uplink channel format is a fourth PUCCH format, and the fourth PUCCH format is a long PUCCH format of more than 2 bits;

the acquiring module 201 is further configured to:

acquire a bit quantity of a UCI corresponding to the fourth PUCCH format and a quantity of REs carrying the UCI;

the calculating module 202 is further configured to:

calculate the uplink power adjustment value according to the bit quantity of the UCI and the quantity of the REs, to control the uplink power.

Optionally, the calculating module 202 is further configured to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS\text{-}symb}^{PUCCH})*M_{SC}^{PUCCH}$, $N_{symb}^{PUCCH}$ is the quantity of the symbols occupied by the fourth PUCCH format, $N_{DMRS\text{-}symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value;

the calculating module 202 is further configured to:

in the case that the bit quantity of the UCI is greater than 11, calculate the uplink power adjustment value by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS\text{-}symb}^{PUCCH})*M_{SC}^{PUCCH}$, $N_{symb}^{PUCCH}$ is the quantity of the symbols occupied by the fourth PUCCH format, $N_{DMRS\text{-}symb}^{PUCCH}$ is a quantity of the symbols occupied by the DMRS in the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers, and k is greater than or equal to 3 and less than or equal to 9.

Optionally, the uplink channel format is a fourth PUCCH format, and the fourth PUCCH format is a long PUCCH format of more than 2 bits;

the acquiring module 201 is further configured to:

acquire a bit quantity of a UCI corresponding to the fourth PUCCH format, a quantity of REs carrying the UCI and a frequency hopping configuration parameter of the fourth PUCCH format; the frequency hopping configuration parameter includes: a parameter of enabling a frequency hopping for a PUCCH or a parameter of not enabling a frequency hopping for a PUCCH;

the calculating module 202 is further configured to:

calculate the uplink power adjustment value according to the bit quantity of the UCI, the quantity of the REs and the frequency hopping configuration parameter of the fourth PUCCH format.

Optionally, the calculating module 202 is further configured to:

in the case that the bit quantity of UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value, where a value of k is related to the frequency hopping configuration parameter of the fourth PUCCH format, or the value of k is not related to the frequency hopping configuration parameter of the fourth PUCCH format;

the calculating module 202 is further configured to:

in the case that the bit quantity of UCI is greater than 11, calculate the uplink power adjustment value by the following formula:

$$\Delta_{PUCCH\_TF,c}(i) = 10\log_{10}\left(\frac{O_{UCI}}{2}*2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers;

in the case that the value of k is related to the frequency hopping configuration parameter of the fourth PUCCH format, a value range of k includes:

in the case that the frequency hopping is not enabled for the fourth PUCCH format, k is greater than or equal to 7 and less than or equal to 9;

in the case that the frequency hopping is enabled for the fourth PUCCH format, k is greater than or equal to 3 and less than 5;

or in the case that the value of k is not related to the frequency hopping configuration parameter of the fourth PUCCH format, k is greater than or equal to 3, and less than or equal to 9.

Optionally, the fourth PUCCH format includes two PUCCH formats of supporting user multiplexing and not supporting user multiplexing.

Optionally, the uplink channel format is a third PUCCH format or a fourth PUCCH format;

where the third PUCCH format is a short PUCCH format of more than 2 bits, and the fourth PUCCH format is a long PUCCH format of more than 2 bits;

the acquiring module 201 is further configured to:

acquire a bit quantity of a UCI corresponding to a PUCCH format and a quantity of REs carrying the UCI;

the calculating module 202 is further configured to:

calculate the uplink power adjustment value according to the bit quantity of the UCI and the quantity of the REs.

Optionally, the calculating module 202 is further configured to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs;

in the case that the PUCCH is in the third PUCCH format, $N_{RE}=\frac{2}{3}*N_{symb}^{PUCCH}*M_{SC}^{PUCCH}$;

in the case that the PUCCH is in the fourth PUCCH format, $N_{RE}=(N_{symb}^{PUCCH}-N_{DMRS-symb}^{PUCCH})*M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value.

Optionally, the bandwidth occupied by the PUCCH is represented by a quantity of subcarriers, and k is greater than or equal to 3 and less than or equal to 9.

It should be noted that the above mobile communication terminal 200 in this embodiment may be a mobile communication terminal of any implementation manner in the method embodiment in the embodiment of the present disclosure, and any implementation manner of the mobile communication terminal in the method embodiment in the present embodiment It is implemented by the above-mentioned mobile communication terminal 200 in this embodiment, and the same beneficial effects are achieved, which will not be repeated here.

Figure 10:
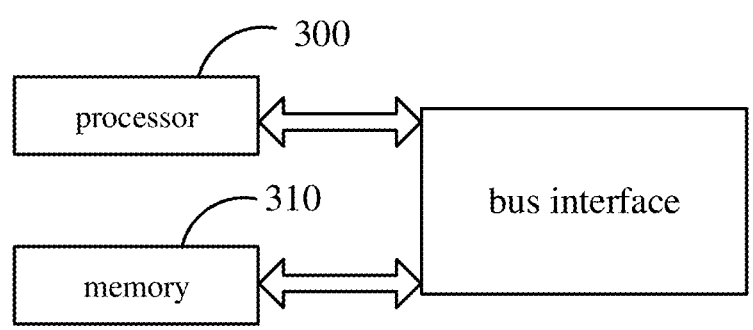
FIG. 10 is a structural diagram of another mobile communication terminal in an embodiment of the present disclosure.

Referring to FIG. 10 which is a schematic structural diagram of another mobile communication terminal in an embodiment of the present disclosure. As shown in FIG. 10, the mobile communication terminal includes: a processor 300, a memory 310, and a bus interface.

The processor 300 is configured to read the program in the memory 310 to:

acquire an uplink transmission parameter corresponding to an uplink channel format;

calculate an uplink power adjustment value according to the uplink transmission parameter, to control an uplink power.

In FIG. 10, the bus architecture may include any number of interconnected buses and bridges, specifically one or more processors represented by the processor 300 and various circuits of the memory represented by the memory 310 are linked together. The bus architecture can also link various other circuits such as peripheral devices, voltage regulators, and power management circuits, etc., which are well known in the art, and therefore, they will not be further described in this article. The bus interface provides an interface.

The processor 300 is responsible for managing the bus architecture and general processing, and the memory 310 may store data used by the processor 300 when performing operations.

Optionally, the uplink channel format is a first Physical Uplink Control Channel (PUCCH) format, and the first PUCCH format is a short PUCCH format of 2 bits or less than 2 bits;

the computer program is executed by the processor 300 to:

acquire a quantity of symbols occupied by the first PUCCH format;

calculate the uplink power adjustment value according to the quantity of the symbols occupied by the first PUCCH format, to control the uplink power.

Optionally, the computer program is executed by the processor 300 to:

calculate the uplink power adjustment value by the following formula:

$$\Delta_{PUCCH\_TF,c}(i) = 10\log_{10}\left(\frac{N_{ref}}{N_{symb}^{PUCCH}}\right);$$

where $\Delta_{PUCCH\_TF,c}(i)$ is the uplink power adjustment value, $N_{symb}^{PUCCH}$ is the quantity of symbols occupied by the first PUCCH format, and $N_{ref}$ is a reference coefficient corresponding to the first PUCCH format.

Optionally, a value of $N_{ref}$ is a preset value or a value configured by a high-layer signaling.

Optionally, the uplink channel format is a second PUCCH format, and the second PUCCH format is a long PUCCH format of 2 bits or less than 2 bits;

the computer program is executed by the processor 300 to:

acquire a quantity of symbols occupied by the second PUCCH format and a quantity of symbols occupied by a Demodulation Reference Signal (DMRS) in the second PUCCH format;

calculate the uplink power adjustment value according to the quantity of the symbols occupied by the second PUCCH format and the quantity of the symbols occupied by the DMRS in the second PUCCH format, to control the uplink power.

Optionally, the computer program is executed by the processor 300 to:

calculate the uplink power adjustment value by the following formula:

$$\Delta_{PUCCH\_TF,c}(i) = 10\log_{10}\left(\frac{N_{ref}}{N_{symb}^{PUCCH} - N_{DMRS-symb}^{PUCCH}}\right);$$

where $\Delta_{PUCCH\_TF,c}(i)$ is the uplink power adjustment value, $N_{symb}^{PUCCH}$ is the quantity of symbols occupied by the second PUCCH format, $N_{DMRS-symb}^{PUCCH}$ is the quantity of symbols occupied by the DMRS in the second PUCCH format, and $N_{ref}$ is a reference coefficient corresponding to the second PUCCH format.

Optionally, a value of $N_{ref}$ is a preset value or a value configured by a high-layer signaling.

Optionally, the uplink channel format is a third PUCCH format, and the third PUCCH format is a short PUCCH format of more than 2 bits;

the computer program is executed by the processor 300 to:

acquire a bit quantity of an Uplink Control Signal (UCI) corresponding to the third PUCCH format and a quantity of Resource Elements (RE) carrying the UCI;

calculate the uplink power adjustment value according to the bit quantity of the UCI and the quantity of the REs, to control the uplink power.

Optionally, the computer program is executed by the processor 300 to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value;

in the case that the bit quantity of the UCI is greater than 11, calculate the uplink power adjustment value by the following formula:

$$\Delta_{PUCCH\_TF,c}(i) = 10\log_{10}\left(\frac{O_{UCI}}{2}*2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers, and k is greater than or equal to 3 and less than or equal to 7.

Optionally, the uplink channel format is a third PUCCH format, and the third PUCCH format is a short PUCCH format of more than 2 bits;

the computer program is executed by the processor 300 to:

acquire a bit quantity of a UCI corresponding to the third PUCCH format, a quantity of REs carrying the UCI and a frequency hopping configuration parameter of the third PUCCH format; the frequency hopping configuration parameter includes: a parameter of enabling a frequency hopping for a PUCCH or a parameter of not enabling a frequency hopping for a PUCCH;

calculate the uplink power adjustment value according to the bit quantity of the UCI, the quantity of the REs and the frequency hopping configuration parameter of the third PUCCH format.

Optionally, the computer program is executed by the processor 300 to:

in the case that the bit quantity of UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and k is a preset value, where a value of k is related to the frequency hopping configuration parameter of the third PUCCH format, or the value of k is not related to the frequency hopping configuration parameter of the third PUCCH format;

in the case that the bit quantity of UCI is greater than 11, calculate the uplink power adjustment value by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=\frac{2}{3}*N_{symb}^{PUCCH}*M_{SC}^{PUCCH}$, $N_{symb}^{PUCCH}$ is the quantity of the symbols occupied by the third PUCCH format, $M_{SC}^{PUCCH}$ is a bandwidth occupied by the third PUCCH format, and $p(N_{RE})$ is a function related to polar coding gain.

Optionally, the bandwidth occupied by the third PUCCH format is represented by a quantity of subcarriers;

in the case that the value of k is related to the frequency hopping configuration parameter of the third PUCCH format, a value range of k includes:

in the case that the frequency hopping is not enabled for the third PUCCH format, k is greater than or equal to 5 and less than or equal to 7;

in the case that the frequency hopping is enabled for the third PUCCH format, k is greater than or equal to 3 and less than 5;

or in the case that the value of k is not related to the frequency hopping configuration parameter of the third PUCCH format, k is greater than or equal to 3, and less than or equal to 7.

Optionally, the uplink channel format is a fourth PUCCH format, and the fourth PUCCH format is a long PUCCH format of more than 2 bits;

the computer program is executed by the processor 300 to:

acquire a bit quantity of a UCI corresponding to the fourth PUCCH format and a quantity of REs carrying the UCI;

calculate the uplink power adjustment value according to the bit quantity of the UCI and the quantity of the REs, to control the uplink power.

Optionally, the computer program is executed by the processor 300 to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value;

in the case that the bit quantity of the UCI is greater than 11, calculate the uplink power adjustment value by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, $O_{UCI}$ is the bit quantity of the UCI, $N_{RE}$ is the quantity of the REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by the DMRS in the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers, and k is greater than or equal to 3 and less than or equal to 9.

Optionally, the uplink channel format is a fourth PUCCH format, and the fourth PUCCH format is a long PUCCH format of more than 2 bits;

the computer program is executed by the processor 300 to:

acquire a bit quantity of a UCI corresponding to the fourth PUCCH format, a quantity of REs carrying the UCI and a frequency hopping configuration parameter of the fourth PUCCH format; the frequency hopping configuration parameter includes: a parameter of enabling a frequency hopping for a PUCCH or a parameter of not enabling a frequency hopping for a PUCCH;

calculate the uplink power adjustment value according to the bit quantity of the UCI, the quantity of the REs and the frequency hopping configuration parameter of the fourth PUCCH format.

Optionally, the computer program is executed by the processor 300 to:

in the case that the bit quantity of UCI is greater than 2 and less than or equal to 11, calculate the uplink power adjustment value by the following formula:

$$\Delta_{PUCCH\_TF,c}(i) = 10\log_{10}\left(\frac{k * O_{UCI}}{N_{RE}}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $N_{DMRS-symb}^{PUCCH}$ is a quantity of the symbols occupied by a DMRS in the fourth PUCCH format, $M_{SC}^{PUCCH}$ is a bandwidth occupied by the fourth PUCCH format, and k is a preset value, where a value of k is related to the frequency hopping configuration parameter of the fourth PUCCH format, or the value of k is not related to the frequency hopping configuration parameter of the fourth PUCCH format;

in the case that the bit quantity of UCI is greater than 11, calculate the uplink power adjustment value by the following formula:

$$\Delta_{PUCCH\_TF,c}(i) = 10\log_{10}\left(\frac{O_{UCI}}{2} * 2^{-p(N_{RE})}\right)$$

where $\Delta_{PUCCH\_TF,c}(i)$ is the uplink power adjustment value, and $O_{UCI}$ is the bit quantity of UCI, $N_{RE}$ is the quantity of REs, $N_{RE}=(N_{symb}^{PUCCH}-N_{DMRS-symb}^{PUCCH})*M_{SC}^{PUCCH}$, $N_{symb}^{PUCCH}$ is the quantity of the symbols occupied by the fourth PUCCH format, $M_{SC}^{PUCCH}$ is a bandwidth occupied by the fourth PUCCH format, and $p(N_{RE})$ is a function related to polar coding gain.

Optionally, the bandwidth occupied by the fourth PUCCH format is represented by a quantity of subcarriers;

in the case that the value of k is related to the frequency hopping configuration parameter of the fourth PUCCH format, a value range of k includes:

in the case that the frequency hopping is not enabled for the fourth PUCCH format, k is greater than or equal to 7 and less than or equal to 9;

in the case that the frequency hopping is enabled for the fourth PUCCH format, k is greater than or equal to 3 and less than 5;

or in the case that the value of k is not related to the frequency hopping configuration parameter of the fourth PUCCH format, k is greater than or equal to 3, and less than or equal to 9.

Optionally, the fourth PUCCH format includes two PUCCH formats of supporting user multiplexing and not supporting user multiplexing.

Optionally, the uplink channel format is a third PUCCH format or a fourth PUCCH format;

where the third PUCCH format is a short PUCCH format of more than 2 bits, and the fourth PUCCH format is a long PUCCH format of more than 2 bits;

the computer program is executed by the processor 300 to:

acquire a bit quantity of a UCI corresponding to a PUCCH format and a quantity of REs carrying the UCI;

calculate the uplink power adjustment value according to the bit quantity of the UCI and the quantity of the REs.

Optionally, the computer program is executed by the processor 300 to:

in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

where $\Delta_{PUCCH\_TF,c}(i)$ is the uplink power adjustment value, $O_{UCI}$ is the bit quantity of the UCI, and $N_{RE}$ is the quantity of the REs;

in the case that the PUCCH is in the third PUCCH format, $N_{RE}=\frac{2}{3}*N_{symb}^{PUCCH}*M_{SC}^{PUCCH}$;

in the case that the PUCCH is in the fourth PUCCH format, $N_{RE}=(N_{symb}^{PUCCH}-N_{DMRS-symb}^{PUCCH})*M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value.

Optionally, the bandwidth occupied by the PUCCH is represented by a quantity of subcarriers, and k is greater than or equal to 3 and less than or equal to 9

In the embodiments of the present disclosure, the involved devices include a sending device (i.e., base station) and a receiving device (i.e., mobile communication terminal). Downlink transmission and uplink reception can be performed between the sending device and the receiving device connected to the sending device.

The base station may be a base station or other types of transmission point equipment in equipment in the related art, and the terminal may be user equipment. Of course, it is not limited to the above two devices. For example, the base station may also be a terminal that can perform configuration operations on other terminals. It can also be considered that a base station contains multiple network sites. The network node may include only radio frequency (such as a remote radio unit (Remote Radio Unit, RRU)) or include two parts of baseband and radio frequency (such as an active antenna). The network node can only include baseband (such as Baseband Unit (BBU)); it can also not include any digital/RF functions of the air interface layer, and is only responsible for high-level signal processing, and put the baseband processing of the air interface layer into the active antenna. There are also many other network implementation possibilities.

The mobile communication terminal may also be called a user equipment (User Equipment, UE), or may be called a Terminal, a mobile station (MS), a mobile terminal (Mobile Terminal), etc. The terminal may pass through a wireless access network (Radio Access (Network, RAN) communicates with one or more core networks, for example, the mobile communication terminal may be a mobile phone (or called a "cellular" phone), a computer with a mobile terminal, etc. For example, the mobile communication terminal may also be a portable, handheld, computer built-in or vehicle-mounted mobile devices that exchange voice and/or data with wireless access networks.

The mobile communication terminal in the embodiments of the present disclosure may also be a device-to-device (D2D) terminal or a machine-to-machine (M2M) terminal. In the embodiments of the present disclosure, the base station and the mobile communication terminal are not specifically limited.

A computer-readable storage medium storing a computer program is further provided in the present disclosure, where the computer program is executed by the processor to perform the uplink power control method applied to the mobile communication terminal.

In the several embodiments provided in this application, it should be understood that the disclosed method and apparatus may be implemented in other ways. For example, the device embodiments described above are only schematic. For example, the division of the units is only a division of logical functions. In actual implementation, there may be other divisions, for example, multiple units or components may be combined or can be integrated into another system, or some features can be ignored, or not implemented. In addition, the displayed or discussed mutual coupling or direct coupling or communication connection may be indirect coupling or communication connection through some interfaces, devices or units, and may be in electrical, mechanical or other forms.

In addition, each functional unit in each embodiment of the present disclosure may be integrated into one processing unit, or each unit may be physically included separately, or two or more units may be integrated into one unit. The above integrated unit can be implemented in the form of hardware, or in the form of hardware plus software functional units.

The above integrated unit implemented in the form of a software functional unit may be stored in a computer-readable storage medium. The above software functional unit is stored in a storage medium, and includes several instructions to enable a computer device (which may be a personal computer, a server, or a network device, etc.) to perform part of the steps of the transceiving methods described in the embodiments of the present disclosure. The aforementioned storage media include: U disk, mobile hard disk, read-only memory (Read-Only Memory, ROM), random access memory (Random Access Memory, RAM), magnetic disk or optical disk and other media that can store program code.

The above are some embodiments of the present disclosure. It should be noted that for those of ordinary skill in the art, without departing from the principles of the present disclosure, several improvements and retouches can be made. These improvements and retouches should also be regarded as the scope of the present disclosure.

What is claimed is:

1. An uplink power control method, comprising:
   acquiring an uplink transmission parameter corresponding to an uplink channel format; and
   calculating an uplink power adjustment value according to the uplink transmission parameter, to control an uplink power,
   wherein,
   the uplink channel format is a first Physical Uplink Control Channel (PUCCH) format, and the first PUCCH format is a short PUCCH format of 2 bits or less that 2 bits;
      the acquiring the uplink transmission parameter corresponding to the uplink channel format comprises: acquiring a quantity of symbols occupied by the first PUCCH format;
      the calculating the uplink power adjustment value according to the uplink transmission parameter comprises: calculating the uplink power adjustment value by the following formula:

$$\Delta_{PUCCH\_TF,c}(i) = 10\log_{10}\left(\frac{N_{ref}}{N_{symb}^{PUCCH}}\right);$$

wherein $\Delta_{PUCCH\_TF,c}(i)$ is the uplink power adjustment value, $N_{symb}^{PUCCH}$ is the quantity of symbols occupied by the first PUCCH format, and $N_{ref}$ is a reference coefficient corresponding to the first PUCCH format;
   or,
   the uplink channel format is a third PUCCH format or a fourth PUCCH format; wherein the third PUCCH format is a short PUCCH format of more than 2 bits, and the fourth PUCCH format is a long PUCCH format of more than 2 bits;
      the acquiring the uplink transmission parameter corresponding to the uplink channel format comprises: acquiring a bit quantity of Uplink Control Information (UCI) corresponding to a PUCCH format and a quantity of Resource Elements (REs) carrying the UCI;
      the calculating the uplink power adjustment value according to the uplink transmission parameter comprises: calculating the uplink power adjustment value according to the bit quantity of the UCI and the quantity of the REs.

2. The method according to claim 1, wherein a value of $N_{ref}$ is a preset value or a value configured by a high-layer signaling.

3. The method according to claim 1, wherein the calculating the uplink power adjustment value according to the bit quantity of the UCI and the quantity of the REs comprises:
   in the case that the bit quantity of the UCI is greater than 2 and less than or equal to 11, calculating the uplink power adjustment value by the following formula:

$$\Delta_{PUCCH\_TF,c}(i) = 10\log_{10}\left(\frac{k*O_{UCI}}{N_{RE}}\right)$$

wherein $\Delta_{PUCCH\_TF,c}(i)$ is the uplink power adjustment value, $O_{UCI}$ is the bit quantity of the UCI, and $N_{RE}$ is the quantity of the REs;
   in the case that the PUCCH is in the third PUCCH format, $N_{RE}=\!2/3*N_{symb}^{PUCCH}*M_{SC}^{PUCCH}$;
   in the case that the PUCCH is in the fourth PUCCH format, $N_{RE}=(N_{symb}^{PUCCH}-N_{DMRS-symb}^{PUCCH})*M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value.

4. The method according to claim 3, wherein the bandwidth occupied by the PUCCH is represented by a quantity of subcarriers, and k is greater than or equal to 3 and less than or equal to 9.

5. A mobile communication terminal, comprising: a memory, a processor, a transceiver and a computer program stored in the memory and executable on the processor, wherein the computer program is executed by the processor to:
   acquire an uplink transmission parameter corresponding to an uplink channel format; and
   calculate an uplink power adjustment value according to the uplink transmission parameter, to control an uplink power,
   wherein,
   the uplink channel format is a first Physical Uplink Control Channel (PUCCH) format, and the first PUCCH format is a short PUCCH format of 2 bits or less that 2 bits;
   the computer program is executed by the processor to:
      acquire a quantity of symbols occupied by the first PUCCH format; and calculate the uplink power adjustment value by the following formula:

$$\Delta_{PUCCH\_TF,c}(i) = 10\log_{10}\left(\frac{N_{ref}}{N_{symb}^{PUCCH}}\right);$$

wherein $\Delta_{PUCCH\_TF,c}(i)$ is the uplink power adjustment value, $N_{symb}^{PUCCH}$ is the quantity of symbols occupied by the first PUCCH format, and $N_{ref}$ is a reference coefficient corresponding to the first PUCCH format;
   or,
   the uplink channel format is a third PUCCH format or a fourth PUCCH format; wherein the third PUCCH format is a short PUCCH format of more than 2 bits, and the fourth PUCCH format is a long PUCCH format of more than 2 bits;

the computer program is executed by the processor to:
acquire a bit quantity of Uplink Control Information (UCI) corresponding to a PUCCH format and a quantity of Resource Elements (REs) carrying the UCI; and
calculate the uplink power adjustment value according to the bit quantity of the UCI and the quantity of the REs.

6. The mobile communication terminal according to claim 5, wherein a value of $N_{ref}$ is a preset value or a value configured by a high-layer signaling.

7. The mobile communication terminal according to claim 5, wherein the computer program is executed by the processor to:
in the case that the bit quantity of the UCI is greater than 2 and less than or equal to 11, calculate the uplink power adjustment value by the following formula:

$$\Delta_{PUCCH\_TF,c}(i) = 10\log_{10}\left(\frac{k*O_{UCI}}{N_{RE}}\right)$$

wherein $\Delta_{PUCCH\_TF,c}(i)$ is the uplink power adjustment value, $O_{UCI}$ is the bit quantity of the UCI, and $N_{RE}$ is the quantity of the REs;
in the case that the PUCCH is in the third PUCCH format, $N_{RE}=\frac{2}{3}*N_{symb}^{PUCCH}*M_{SC}^{PUCCH}$;
in the case that the PUCCH is in the fourth PUCCH format, $N_{RE}=(N_{symb}^{PUCCH}-N_{DMRS-symb}^{PUCCH})*M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value.

8. The mobile communication terminal according to claim 7, wherein the bandwidth occupied by the PUCCH is represented by a quantity of subcarriers, and k is greater than or equal to 3 and less than or equal to 9.

9. A non-transitory computer readable storage medium, comprising:
a computer program stored on the non-transitory computer readable storage medium, wherein, when the computer program is executed by a processor, the processor implements following steps:
acquiring an uplink transmission parameter corresponding to an uplink channel format; and
calculating an uplink power adjustment value according to the uplink transmission parameter, to control an uplink power,
wherein,
the uplink channel format is a first Physical Uplink Control Channel (PUCCH) format, and the first PUCCH format is a short PUCCH format of 2 bits or less than 2 bits;
the acquiring the uplink transmission parameter corresponding to the uplink channel format comprises: acquiring a quantity of symbols occupied by the first PUCCH format;
the calculating the uplink power adjustment value according to the uplink transmission parameter comprises: calculating the uplink power adjustment value by the following formula:

$$\Delta_{PUCCH\_TF,c}(i) = 10\log_{10}\left(\frac{N_{ref}}{N_{symb}^{PUCCH}}\right);$$

wherein $\Delta_{PUCCH\_TF,c}(i)$ the uplink power adjustment value, $N_{symb}^{PUCCH}$ quantity of symbols occupied by the first PUCCH format, and $N_{ref}$ is a reference coefficient corresponding to the first PUCCH format;
or,
the uplink channel format is a third PUCCH format or a fourth PUCCH format; wherein the third PUCCH format is a short PUCCH format of more than 2 bits, and the fourth PUCCH format is a long PUCCH format of more than 2 bits;
the acquiring the uplink transmission parameter corresponding to the uplink channel format comprises: acquiring a bit quantity of Uplink Control Information (UCI) corresponding to a PUCCH format and a quantity of Resource Elements (REs) carrying the UCI;
the calculating the uplink power adjustment value according to the uplink transmission parameter comprises: calculating the uplink power adjustment value according to the bit quantity of the UCI and the quantity of the REs.

10. The non-transitory computer readable storage medium according to claim 9, wherein, a value of $N_{ref}$ is a preset value or a value configured by a high-layer signaling.

11. The non-transitory computer readable storage medium according to claim 9, wherein the calculating the uplink power adjustment value according to the bit quantity of the UCI and the quantity of the REs comprises:
in the case that the bit quantity of the UCI is greater than 2 and less than or equal to 11, calculating the uplink power adjustment value by the following formula:

$$\Delta_{PUCCH\_TF,c}(i) = 10\log_{10}\left(\frac{k*O_{UCI}}{N_{RE}}\right)$$

wherein $\Delta_{PUCCH\_TF,c}(i)$ is the uplink power adjustment value, $O_{UCI}$ is the bit quantity of the UCI, and $N_{RE}$ is the quantity of the REs;
in the case that the PUCCH is in the third PUCCH format, $N_{RE}=\frac{2}{3}*N_{symb}^{PUCCH}*M_{SC}^{PUCCH}$;
in the case that the PUCCH is in the fourth PUCCH format, $N_{RE}=(N_{symb}^{PUCCH}-N_{DMRS-symb}^{PUCCH})*M_{SC}^{PUCCH}$, $N_{symb}^{PUCCH}$ is the quantity of symbols occupied by the PUCCH, $N_{DMRS-symb}^{PUCCH}$ is a quantity of symbols occupied by the DMRS in the PUCCH, $M_{SC}^{PUCCH}$ is a bandwidth occupied by the PUCCH, and k is a preset value.

12. The non-transitory computer readable storage medium according to claim 11, wherein the bandwidth occupied by the PUCCH is represented by a quantity of subcarriers, and k is greater than or equal to 3 and less than or equal to 9.

* * * * *